US012663234B2

(12) United States Patent
Dabush et al.

(10) Patent No.: US 12,663,234 B2
(45) Date of Patent: Jun. 23, 2026

(54) SYSTEM AND METHOD FOR PROXIMITY BASED ASSIGNMENT

(71) Applicant: V-Armed Inc., New York, NY (US)

(72) Inventors: Elad Dabush, New York, NY (US); Rotem Shiffman, Brooklyn, NY (US)

(73) Assignee: V-Armed Inc.

( * ) Notice: Subject to any disclaimer, the term of this patent is extended or adjusted under 35 U.S.C. 154(b) by 399 days.

(21) Appl. No.: 18/524,272

(22) Filed: Nov. 30, 2023

(65) Prior Publication Data

US 2024/0110762 A1 Apr. 4, 2024

Related U.S. Application Data

(63) Continuation-in-part of application No. 18/219,100, filed on Jul. 7, 2023, now abandoned, which is a
(Continued)

(51) Int. Cl.
*F41A 33/00* (2006.01)
*F41A 33/02* (2006.01)
(Continued)

(52) U.S. Cl.
CPC .............. *F41A 33/00* (2013.01); *F41A 33/02* (2013.01); *F41G 3/2622* (2013.01);
(Continued)

(58) Field of Classification Search
CPC .......... F41A 33/00; G09B 9/003; G09B 9/006
See application file for complete search history.

(56) References Cited

U.S. PATENT DOCUMENTS 4,030,769 A 6/1977 Peng
5,816,817 A 10/1998 Tsang
(Continued)

FOREIGN PATENT DOCUMENTS

KR 100866847 B1 11/2008
KR 101153231 B1 6/2012
(Continued)

OTHER PUBLICATIONS

Aristidou, Andreas, Graphical Models—FABRIK: A fast, iterative solver for the Inverse Kinematics problem, University of Cambridge, Elsevier, May 15, 2011, (73) 243-260, accessible at: https://www.researchgate.net/publication/220632147_FABRIK_A_fast_iterative_solver_for_the_Inverse_Kinematics_problem.
(Continued)

*Primary Examiner* — Kurt Fernstrom
(74) *Attorney, Agent, or Firm* — Gearhart Law, LLC

(57) ABSTRACT

Disclosed embodiments provide systems and methods for simulation of firearm discharge and training of armed forces and/or law enforcement personnel. A motion tracking system tracks motion of one or more users. In embodiments, the users wear one or more sensors on their bodies to allow tracking by the motion tracking system. A scenario management system utilizes position, orientation, and motion information provided by the motion tracking system to evaluate user performance during a scenario. A weapon simulator includes sensors that indicate position of the weapon and/or orientation of the weapon. The weapon simulator may further provide trigger activation indications to the scenario management system. In embodiments, the scenario management system generates, plays, reviews, and/or evaluates simulations. The evaluation can include scoring based on reaction times, posture, body position, body orientation, and/or other attributes.

19 Claims, 26 Drawing Sheets

Related U.S. Application Data continuation of application No. 17/751,694, filed on May 24, 2022, now abandoned, which is a continuation of application No. 17/015,425, filed on Sep. 9, 2020, now Pat. No. 11,371,794, which is a continuation of application No. 15/865,731, filed on Jan. 9, 2018, now Pat. No. 10,922,992.

(51) Int. Cl.

| | |
|---|---|
| *F41G 3/26* | (2006.01) |
| *G06F 3/01* | (2006.01) |
| *G09B 9/00* | (2006.01) |

(52) U.S. Cl.

CPC ........... *F41G 3/2694* (2013.01); *G06F 3/012* (2013.01); *G06F 3/013* (2013.01); *G09B 9/003* (2013.01)

(56) References Cited

U.S. PATENT DOCUMENTS

| | | | | |
|---|---|---|---|---|
| 6,192,614 | B1 | 2/2001 | Cliburn | |
| 8,320,621 | B2 | 11/2012 | McEldowney | |
| 8,744,121 | B2 | 6/2014 | Polzin | |
| 8,825,187 | B1 | 9/2014 | Hamrick | |
| 8,920,172 | B1 | 12/2014 | Wilmink | |
| 9,223,786 | B1 * | 12/2015 | Hamrick | G06F 16/4393 |
| 9,225,969 | B2 | 12/2015 | Aguirre-Valencia | |
| 9,401,178 | B2 | 7/2016 | Bentley | |
| 9,406,336 | B2 | 8/2016 | Bose | |
| 9,418,705 | B2 | 8/2016 | Kaps | |
| 9,454,909 | B1 | 9/2016 | Siddle | |
| 9,607,652 | B2 | 3/2017 | Bose | |
| 9,646,209 | B2 | 5/2017 | Kaps | |
| 9,656,162 | B2 | 5/2017 | Polzin | |
| 10,032,386 | B2 * | 7/2018 | Biran | G09B 9/003 |
| 10,114,127 | B2 * | 10/2018 | Brown | F41G 3/165 |
| 10,241,573 | B2 * | 3/2019 | Mallinson | A63F 13/235 |
| 10,242,501 | B1 | 3/2019 | Pusch | |
| 10,922,992 | B2 | 2/2021 | Kur | |
| 11,132,915 | B1 * | 9/2021 | McIver | G06F 3/011 |
| 11,371,794 | B2 | 6/2022 | Kur | |
| 12,078,454 | B2 * | 9/2024 | Ferren | F41G 3/26 |
| 12,429,947 | B2 * | 9/2025 | Wallack | G02B 27/017 |
| 2012/0156652 | A1 | 6/2012 | Lane | |
| 2012/0231423 | A1 | 9/2012 | Reardon | |
| 2013/0127980 | A1 | 5/2013 | Haddick | |
| 2013/0231423 | A1 | 9/2013 | Rumpf | |
| 2013/0278631 | A1 | 10/2013 | Border | |
| 2014/0361977 | A1 | 12/2014 | Stafford | |
| 2015/0358543 | A1 | 12/2015 | Kord | |
| 2015/0364053 | A1 * | 12/2015 | Quail | G09B 9/003 434/11 |
| 2015/0370320 | A1 | 12/2015 | Connor | |
| 2016/0025253 | A1 | 1/2016 | Bradski | |
| 2016/0284136 | A1 | 9/2016 | Johnston | |
| 2017/0082390 | A1 | 3/2017 | Morgan | |
| 2017/0132845 | A1 | 5/2017 | Everman, II | |
| 2017/0228130 | A1 | 8/2017 | Palmaro | |
| 2019/0213901 | A1 | 7/2019 | Kur | |
| 2020/0341542 | A1 | 10/2020 | Kur | |
| 2020/0408480 | A1 | 12/2020 | Kur | |
| 2021/0020062 | A1 | 1/2021 | Kur | |
| 2024/0118051 | A1 | 4/2024 | Kur | |

FOREIGN PATENT DOCUMENTS

| | | |
|---|---|---|
| KR | 101414147 B1 | 7/2014 |
| WO | 2013111145 A1 | 8/2013 |
| WO | 2013111146 A2 | 8/2013 |
| WO | 2017132539 A1 | 8/2017 |
| WO | 2018130696 A2 | 7/2018 |

OTHER PUBLICATIONS

International Search Report and Written Opinion dated May 16, 2019, for corresponding International Application No. PCT/US2019/012591, International Filing Date of Jan. 8, 2019, consisting of 9 pages.

* cited by examiner

1000

1002 — DETERMINE USER POSITION

1004 — DETERMINE INITIAL PHYSIOLOGICAL ORIENTATION

1006 — DETECT SIMULATED FIREARM DISCHARGE

1008 — DETERMINE USER REACTION

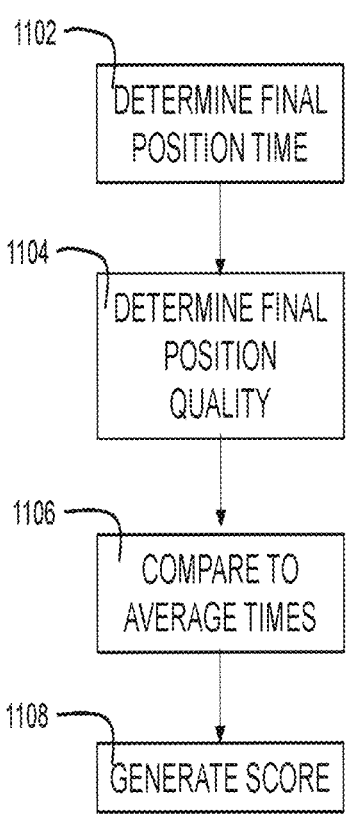
FIG. 11

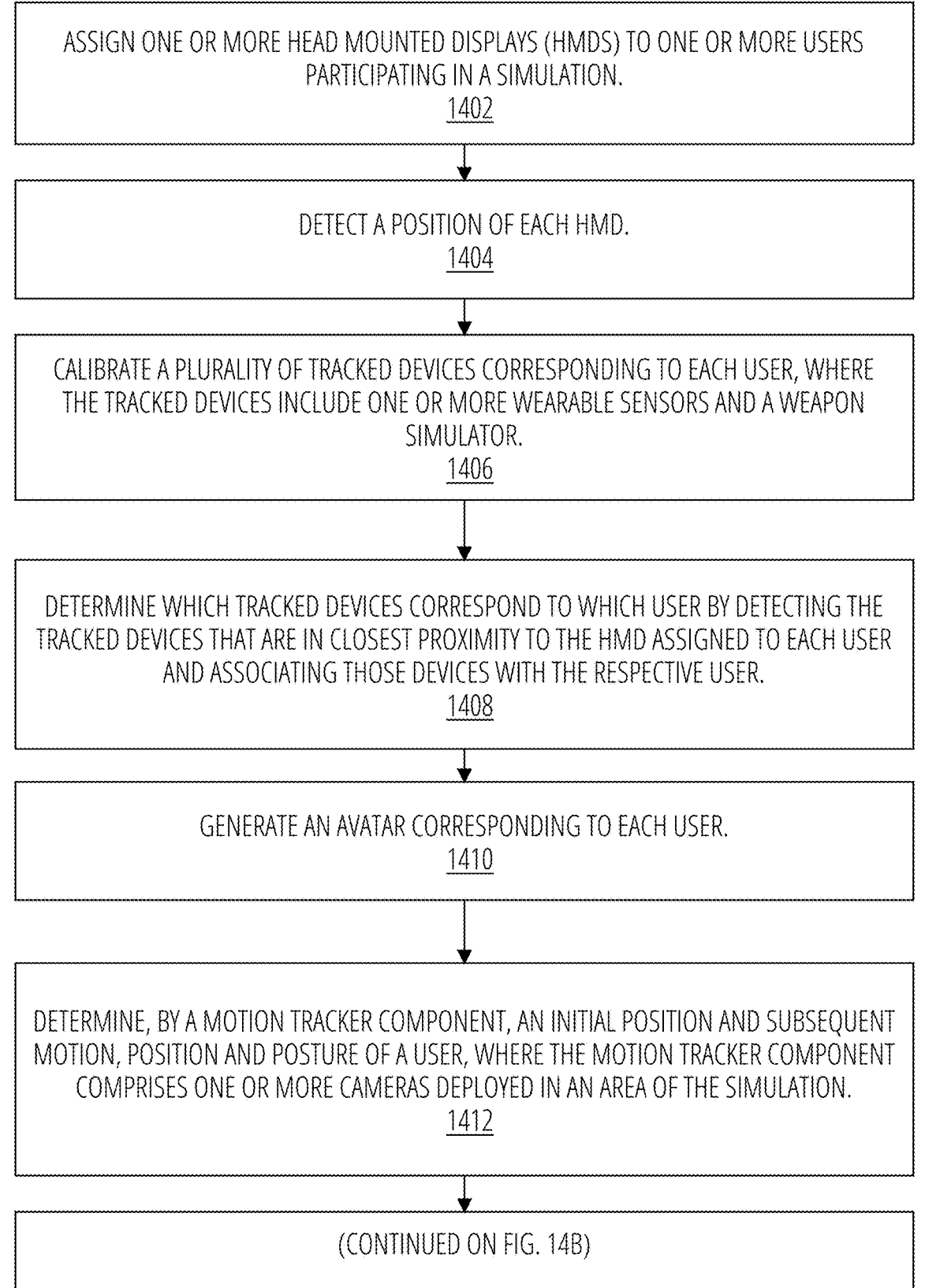

ASSIGN ONE OR MORE HEAD MOUNTED DISPLAYS (HMDS) TO ONE OR MORE USERS PARTICIPATING IN A SIMULATION.
1402

DETECT A POSITION OF EACH HMD.
1404

CALIBRATE A PLURALITY OF TRACKED DEVICES CORRESPONDING TO EACH USER, WHERE THE TRACKED DEVICES INCLUDE ONE OR MORE WEARABLE SENSORS AND A WEAPON SIMULATOR.
1406

DETERMINE WHICH TRACKED DEVICES CORRESPOND TO WHICH USER BY DETECTING THE TRACKED DEVICES THAT ARE IN CLOSEST PROXIMITY TO THE HMD ASSIGNED TO EACH USER AND ASSOCIATING THOSE DEVICES WITH THE RESPECTIVE USER.
1408

GENERATE AN AVATAR CORRESPONDING TO EACH USER.
1410

DETERMINE, BY A MOTION TRACKER COMPONENT, AN INITIAL POSITION AND SUBSEQUENT MOTION, POSITION AND POSTURE OF A USER, WHERE THE MOTION TRACKER COMPONENT COMPRISES ONE OR MORE CAMERAS DEPLOYED IN AN AREA OF THE SIMULATION.
1412

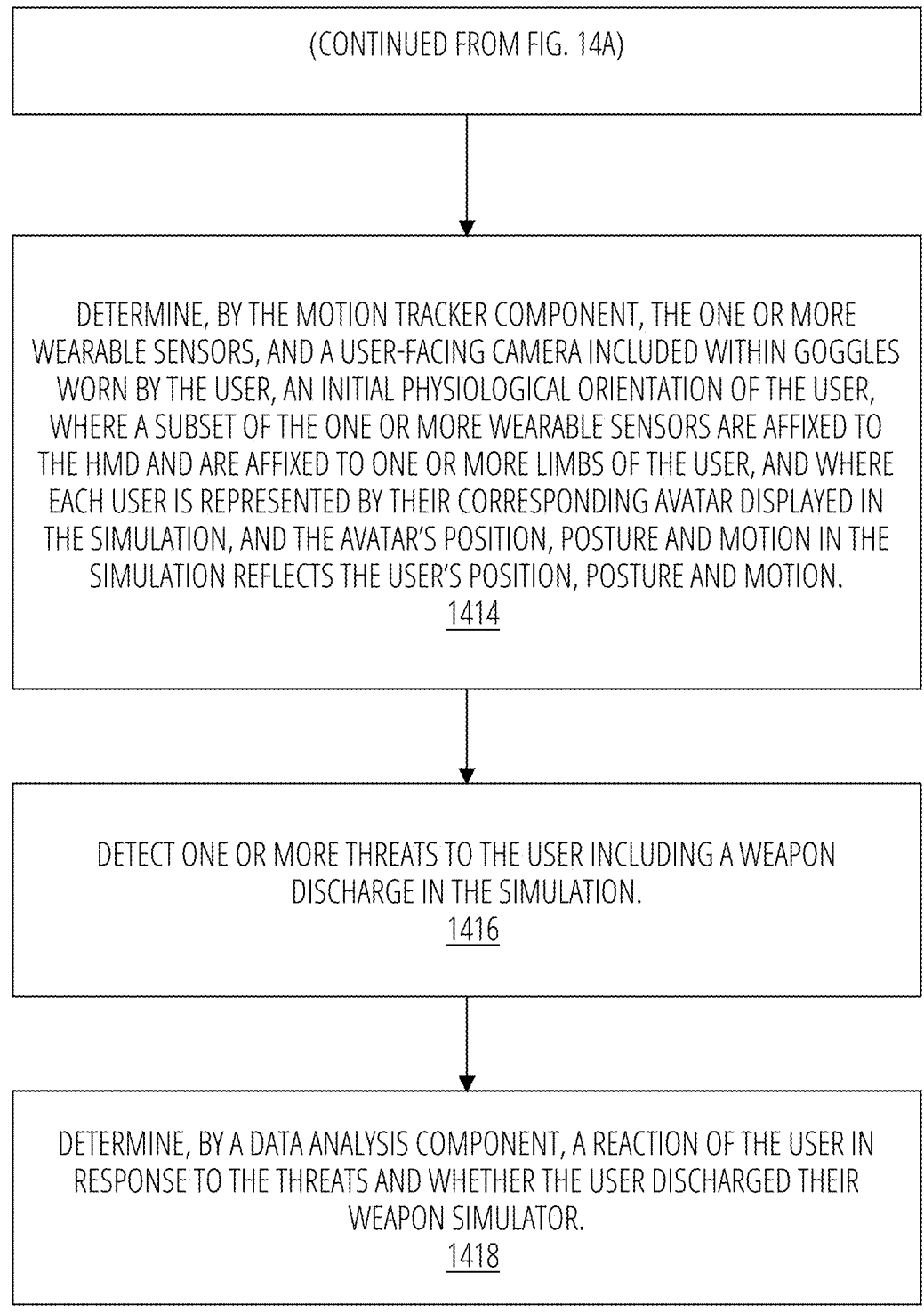

(CONTINUED FROM FIG. 14A)

DETERMINE, BY THE MOTION TRACKER COMPONENT, THE ONE OR MORE WEARABLE SENSORS, AND A USER-FACING CAMERA INCLUDED WITHIN GOGGLES WORN BY THE USER, AN INITIAL PHYSIOLOGICAL ORIENTATION OF THE USER, WHERE A SUBSET OF THE ONE OR MORE WEARABLE SENSORS ARE AFFIXED TO THE HMD AND ARE AFFIXED TO ONE OR MORE LIMBS OF THE USER, AND WHERE EACH USER IS REPRESENTED BY THEIR CORRESPONDING AVATAR DISPLAYED IN THE SIMULATION, AND THE AVATAR'S POSITION, POSTURE AND MOTION IN THE SIMULATION REFLECTS THE USER'S POSITION, POSTURE AND MOTION.
1414

DETECT ONE OR MORE THREATS TO THE USER INCLUDING A WEAPON DISCHARGE IN THE SIMULATION.
1416

DETERMINE, BY A DATA ANALYSIS COMPONENT, A REACTION OF THE USER IN RESPONSE TO THE THREATS AND WHETHER THE USER DISCHARGED THEIR WEAPON SIMULATOR.
1418

FIG. 14B

SYSTEM AND METHOD FOR PROXIMITY BASED ASSIGNMENT

CROSS-REFERENCE TO RELATED APPLICATIONS SECTION

This application is a continuation-in-part (CIP) of application Ser. No. 18/219,100 filed on Jul. 7, 2023, which is a continuation of application Ser. No. 17/751,694 filed on May 24, 2022, which is a continuation of application Ser. No. 17/015,425 filed on Sep. 9, 2020, which is a continuation of application Ser. No. 15/865,731 filed Jan. 9, 2018. The disclosures of all prior applications are hereby incorporated by reference herein in their entirety.

FIELD OF THE EMBODIMENTS

Disclosed embodiments relate to firearm simulation and training, and more particularly to firearm simulation and training utilizing motion tracking.

BACKGROUND

Military training programs of the US Armed Forces are vital for mission success. Military training, aimed at the accomplishment of tasks associated with a military mission, is an important part of troop readiness. Without proper training, soldiers may be unprepared for an actual battle. Similarly, law enforcement personnel benefit from training for various situations they may encounter during their patrols. In law enforcement, personnel may not have much advance notice of when they will be in a dangerous situation. Thus, periodic training exercises are important for law enforcement to maintain a state of readiness.

When using a multi-participant virtual reality (VR) or augmented reality (AR) simulation which makes use of tracked equipment and one or more participants, the system needs to know which devices correspond to which participant in order to represent their avatar in the simulation. Associating each device statically with a participant has several disadvantages, including how long it takes to calibrate, tag, or assign (associate) the devices to each participant and difficulties related to swapping or exchanging devices during a running simulation in case of malfunction. There is therefore a need to quickly and efficiently associate all devices with their corresponding participant in a VR or AR simulation and update the associations as needed during the simulation.

SUMMARY OF THE EMBODIMENTS

In one embodiment, there is provided a computer-implemented method for conducting a firearm usage simulation, comprising: determining a position of a user; determining an initial physiological orientation of the user; detecting a simulated firearm discharge; and determining a reaction of the user in response to the simulated firearm discharge.

In another embodiment, determining a physiological orientation of the user comprises determining a position of one or more limbs of the user.

In another embodiment, determining a physiological orientation of the user comprises determining a facial direction of the user.

In another embodiment, determining a physiological orientation of the user comprises determining an eye gaze direction of the user.

Another embodiment includes comparing a second physiological orientation of the user to an expected physiological orientation of the user; and generating a user score based on the comparison.

In another embodiment, comparing the second physiological orientation of the user to an expected physiological orientation of the user includes comparing a position of one or more limbs.

In another embodiment, comparing the second physiological orientation of the user to an expected physiological orientation of the user includes comparing a facial direction of the user to an expected facial direction.

Another embodiment includes measuring a duration from a time of the simulated firearm discharge to a time of detecting the second physiological orientation.

In another embodiment, generating the user score is further based on the duration.

In another embodiment, generating the user score is further based on a weapon draw time.

In another embodiment, generating the user score is further based on a weapon discharge time.

Embodiments include a weapon usage evaluation system, comprising: a motion tracking system, configured and disposed to track one or more users; a scenario management system, configured and disposed to receive motion information from the motion tracking system; and a weapon simulator, wherein the weapon simulator is configured and disposed to provide discharge information and position information to the scenario management system.

In another embodiment, the system includes an inertial tracking device affixed to the weapon simulator.

In another embodiment, the system includes a shock mount configured and disposed between the weapon simulator and the inertial tracking device.

In another embodiment, the shock mount comprises: a top plate; a bottom plate; and a plurality of resilient members configured and disposed between the top plate and the bottom plate.

In another embodiment, the weapon simulator comprises: a trigger; a motor configured and disposed to generate a vibration in response to activation of the trigger; a communication module configured and disposed to wirelessly transmit a trigger indication to the scenario management system in response to activation of the trigger.

In another embodiment, the system includes an inverse kinematic solver.

In another embodiment, the system includes: a processor; a memory coupled to the processor, wherein the memory contains instructions, that when executed by the processor, cause the processor to perform steps of: determining a position of a user; determining an initial physiological orientation of the user; detecting a simulated firearm discharge; and determining a reaction of the user in response to the simulated firearm discharge.

In another embodiment, the memory further contains instructions, that when executed by the processor, cause the processor to perform the step of determining a position of one or more limbs of the user.

In another embodiment, the memory further contains instructions, that when executed by the processor, cause the processor to perform the step of determining a facial direction of the user.

BRIEF DESCRIPTION OF THE DRAWINGS

FIG. 11 is a flowchart indicating additional process steps for embodiments of the present invention.

FIGS. 14A-14B show a computer-implemented method for conducting a firearm usage simulation in accordance with an embodiment of the present invention.

The structure, operation, and advantages of disclosed embodiments will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity.

DETAILED DESCRIPTION

Disclosed embodiments provide systems and methods for conducting a firearm usage simulation including simulated firearm discharge, enabling enhanced training of armed forces and/or law enforcement personnel. A motion tracking system tracks motion of one or more users. In embodiments, the users wear one or more sensors, transponders, or other wearable devices on their bodies to allow tracking by the motion tracking system. A scenario management system utilizes position, orientation, and motion information provided by the motion tracking system to evaluate user performance during a scenario. A weapon simulator includes sensors that indicate position of the weapon and/or orientation of the weapon. The weapon simulator may further provide trigger activation indications to the scenario management system. In embodiments, the scenario management system generates, plays, reviews, and/or evaluates simulations. The evaluation can include scoring based on reaction times, posture, body position, body orientation, and/or other attributes. Thus, disclosed embodiments provide a safe and cost-effective way to train personnel in the use of a weapon in various scenarios, and evaluate the users based on information provided by the motion tracking system and/or weapon simulator.

Figure 1:
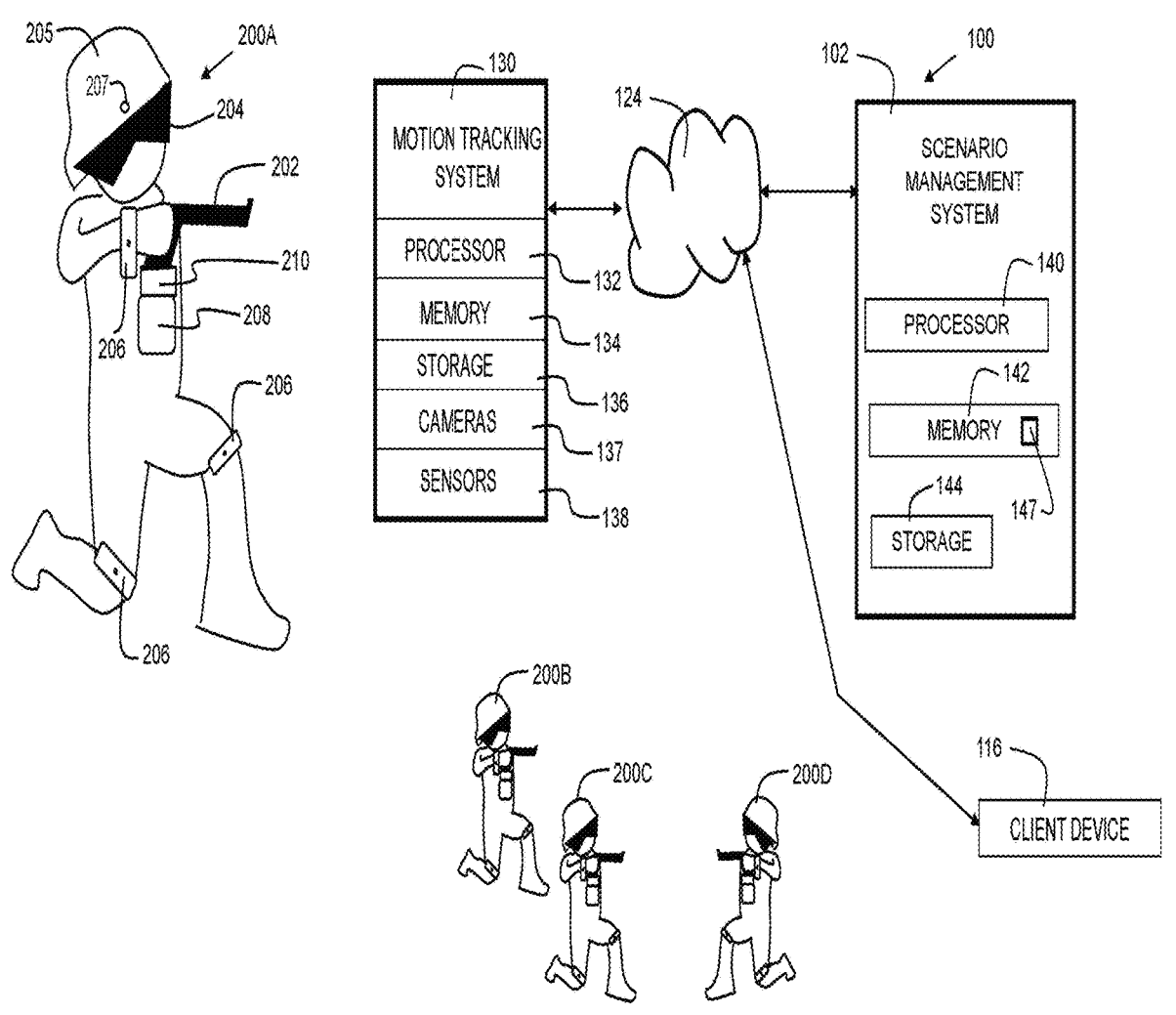
FIG. 1 is a diagram of a system in accordance with embodiments of the present invention.

FIG. 1 is a diagram of a system 100 in accordance with embodiments of the present invention. System 100 includes a scenario management system 102. The scenario management system 102 can be implemented in an electronic computing device that includes a processor 140, a memory 142 coupled to the processor, and storage 144, also coupled to the processor 140. Memory 142 contains instructions 147, that when executed by the processor 140, cause the scenario management system 102 to perform steps in accordance with embodiments of the present invention. Memory 142 may be a non-transitory computer readable medium. Memory 142 may include, but is not limited to, flash, read-only memory (ROM), static random-access memory (SRAM), magnetic storage, optical storage, or other suitable storage mechanism. Storage 144 may include one or more magnetic hard disk drives (HDD), solid state disk drives (SSD), optical storage devices, tape drives, and/or other suitable storage devices.

In embodiments, storage 144 may include multiple hard disk drives configured in a RAID (redundant array of independent disks) configuration. In embodiments, the RAID configuration can include a RAID 1 configuration in which data is copied seamlessly and simultaneously, from one disk to another, creating a replica, or mirror. If one hard disk drive becomes inoperable, another hard disk drive continues to operate, providing a level of fault tolerance.

The processor 140 may include multiple cores. In embodiments, the scenario management system 102 may include multiple processors, where each processor includes multiple cores. Embodiments may schedule tasks and threads over multiple processors and/or cores to achieve a level of parallelism in execution of various tasks such as computations, rendering, and/or scenario generation.

Embodiments may include additional redundancy through failover mechanisms. In embodiments, the scenario management system 102 may be instantiated as a virtual machine operating in a cloud environment. In embodiments, multiple instantiations of the scenario management system 102 may be implemented in the cloud environment. Scenario management system 102 is in communication with network 124. Network 124 may be the Internet, a local area network (LAN), wide area network (WAN), or another suitable network.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet can be provided by Internet service providers (ISP). Users on client systems, such as client 116 obtains access to the Internet through the Internet service providers. Access to the Internet allows users of the client computer systems to exchange information, receive and send e-mails, and view documents, such as documents which have been prepared in the HTML format. These documents are often provided by web servers which are considered to be "on" the Internet. Often these web servers are provided by the ISPs, although a computer system can be set up and connected to the Internet without that system being also an ISP as is well known in the art.

System 100 further includes motion tracking system 130. Motion tracking system 130 includes a processor 132, a memory 134 coupled to the processor, and storage 136, also coupled to the processor 132. Memory 134 contains instructions, that when executed by the processor 132, cause the motion tracking system 130 to perform steps in accordance with embodiments of the present invention. Memory 134 may be a non-transitory computer readable medium.

Memory 134 may include, but is not limited to, flash, read-only memory (ROM), static random-access memory (SRAM), magnetic storage, optical storage, or other suitable storage mechanism. Storage 136 may include one or more magnetic hard disk drives (HDD), solid state disk drives (SSD), optical storage devices, tape drives, and/or other suitable storage devices. In embodiments, memory 134 includes at least 32 gigabytes of RAM. Motion tracking system 130 further includes one or more cameras 137. The cameras may be configured to detect visible and/or infrared light. The motion tracking system 130 may further include one or more sensors. These sensors may include, but are not limited to, temperature sensors, proximity sensors, noise sensors, and/or other suitable sensors. In some embodiments, processor 132 may include an Intel i7 CPU or higher. The motion tracking system 130 may include a graphics processor such as the Nvidia GTX 1070 or higher, and include a high-performance network card.

A client device, indicated as 116 may be connected to network 124 via a wired or wireless interface. Client device 116 may include a mobile computing device such as a smartphone or tablet, a laptop computer, a desktop computer, or other suitable computing device. The client-server architecture allows a user to remotely access features of the scenario management system 102. In embodiments, the client device 116 may include an Intel i7 CPU or higher, an Nvidia GTX 1080 graphics processing unit or higher, and 16 GB of ram or more.

Embodiments of the present invention may utilize a JavaScript Object Notation (JSON) web service to make a JSON call to the scenario management system. In some examples, the JSON call is made using XML HTTP, which implements an XML HTTP object that has functionality enabling the exchange of Extensible Markup Language (XML) data directly over the Internet using the Hypertext Transfer Protocol (HTTP). The XML HTTP object allows access of the scenario management system data from a server, parsing the data using an XML Document Object Model (DOM), and posting XML data through a standard firewall directly to an HTTP server.

The cameras 137 and/or sensors 138 of motion tracking system 130 may be deployed in a venue such as a room, building, or outdoor area, such that they can track the motion of one or more users (200A, 200B, 200C, and 200D). Note that while four users are shown in FIG. 1, in practice, more or fewer users may be present. Referring now to user 200A, additional detail is shown. Each user may utilize one or more wearable sensors 206. The wearable sensors can be used to detect motion and position of a user. By having sensors on the limbs of a user, the position and/or orientation of a user can be more precisely determined. Each user may further wear a helmet with head mounted display (HMD) 205. The helmet with HMD 205 may include a sensor 207 that can be used to determine head location and/or head orientation of the wearer (user). Each user may further wear goggles 204 or a visor integrated into the helmet. The goggles 204 may include virtual reality goggles, augmented reality goggles, or other suitable eyewear. The goggles 204 may further include speakers that provide audible feedback to a user. In embodiments, the goggles 204 may include a forward-facing camera to enable recording and/or monitoring of the user's point of view. In embodiments, the goggles 204 may include a user-facing camera to monitor the eye gaze of a user. In this way, the direction of eye gaze, even if different from head orientation, can be ascertained. The built-in visor can include all the aforementioned features of the goggles and the helmet may also include built-in speakers. The terms helmet, virtual reality (VR) helmet, augmented reality (AR) helmet, and head mounted display (HMD) shall be regarded as equivalent terms and may be used interchangeably throughout this application.

Each user may further utilize a weapon simulator 202. The weapon simulator may be in the form of a firearm, and may include a recoil simulation mechanism such as compressed air or a mechanical spring to simulate the recoil associated with discharging a real firearm. The weapon simulator 202 may further include an inertial tracker 208 affixed to the weapon simulator 202. The inertial tracker 208 may include one or more accelerometers and/or gyroscopes to track motion of the weapon simulator 202. Sometimes, motion associated with recoil can adversely affect the inertial tracker 208. Therefore, embodiments may further include a shock mount 210 disposed between the weapon simulator 202 and the inertial tracker 208. This allows the position of the weapon simulator to be tracked as the user moves it, while preventing the adverse effects of recoil motion, since the shock mount absorbs some of the recoil motion.

As discussed above, the motion tracking system may include one or more cameras deployed in an area of a firearm usage simulation, configured to track devices, such as the weapon simulator, or body markers associated with each of one or more users including the wearable sensors, transponders, etc. worn by the one or more users and the weapon simulator. The head mounted display (HMD) is assigned to each of the users at the start of the simulation so that each user has a corresponding HMD. A proximity detection module is configured to detect the trackable devices and markers in closest proximity to each HMD and associate those devices with the user corresponding to the HMD. Proximity detection and tracking of the trackable devices or markers may be achieved through use of the OptiTrack® system or other available tracking systems. The HMD, trackable devices, and body markers can all be accurately mapped and tracked in the firearm usage simulation. Moreover, in the event a trackable device or marker is replaced, exchanged, or added (e.g., due to malfunction or participants exchanging or acquiring devices/markers from each other) the proximity detection module automatically maps the replacement or added device or marker to the participant when it becomes part of the group of devices/markers in closest proximity to the HMD assigned to that participant. There is therefore no need to manually assign the trackable devices or markers to each individual participant, as the assignment occurs automatically and dynamically during the simulation.

The scenario management system includes an avatar generator configured to generate an avatar representing each user in the VR or AR simulation. The avatar is generated by mapping the trackable devices/body markers associated with each HMD to the participant assigned to that HMD. The avatar's position, posture and movement reflect the user's position, posture, and movement in the simulation. The avatar in the VR/AR simulation is therefore an accurate representation of its counterpart (i.e., moves in accordance with its corresponding participant) in the firearm usage simulation.

The scenario management system is configured to receive motion information of the one or more participants from the motion tracking system and threat detection information, including discharge of a weapon. Threats may include human or autonomous (e.g., robotic, simulated, and/or artificial intelligence controlled) threats in the simulation. The weapon simulator is configured to provide discharge information associated with discharge of the weapon simulator in the simulation and position and orientation information of the weapon simulator at the time of discharge to the scenario management system including reaction time information, such as reaction to the threat.

Figure 2:
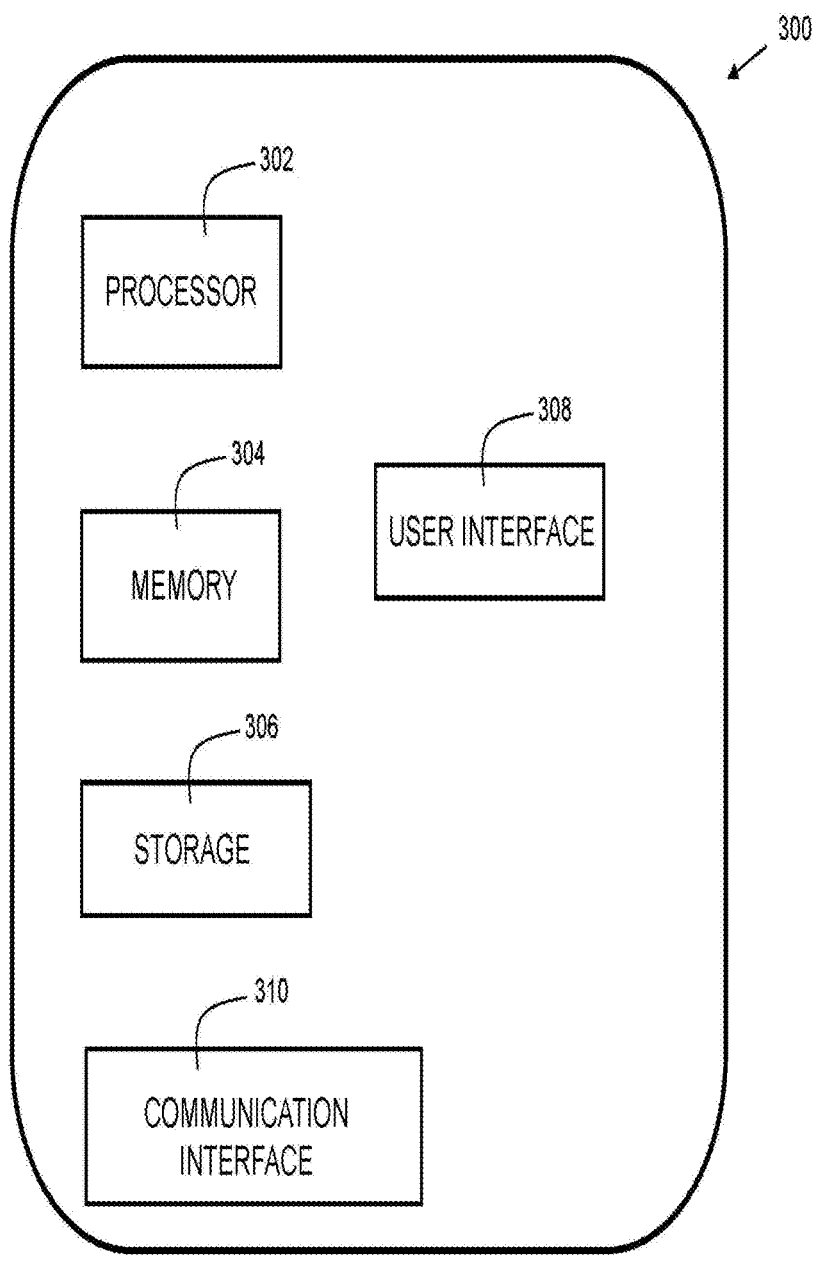
FIG. 2 is a diagram of a client device in accordance with embodiments of the present invention.

FIG. 2 is a block diagram of a client device 300 in accordance with embodiments of the present invention. In embodiments, client device 300 is an electronic device that may include a desktop computer, laptop computer, tablet computer, smartphone, and/or other suitable client device. Client device 300 may be similar to client device 116 as shown in FIG. 1. Client device 300 includes a processor 302, a memory 304 coupled to the processer 302, and storage 306. The memory 304 may be a non-transitory computer readable medium. Memory 304 may include RAM, ROM, flash, EEPROM, or other suitable storage technology. The memory 304 contains instructions, that when executed by processor 302, enable communication to/from scenario management system 102 of FIG. 1. Client device 300 further includes a network communication interface 310 for performing this communication. In embodiments, network communication interface 310 includes a wireless communications interface such as a cellular data interface and/or a Wi-Fi interface. In embodiments, the storage 306 includes flash, SRAM, one or more hard disk drives (HDDs) and/or solid state disk drives (SDDs).

Device 300 may further include a user interface 308. User interface 308 may include a keyboard, monitor, mouse, and/or touchscreen, and provides a user with the ability to enter information as necessary to utilize embodiments of the present invention. In embodiments, a user uses the device 300 to access the scenario management system 102.

Figure 3:
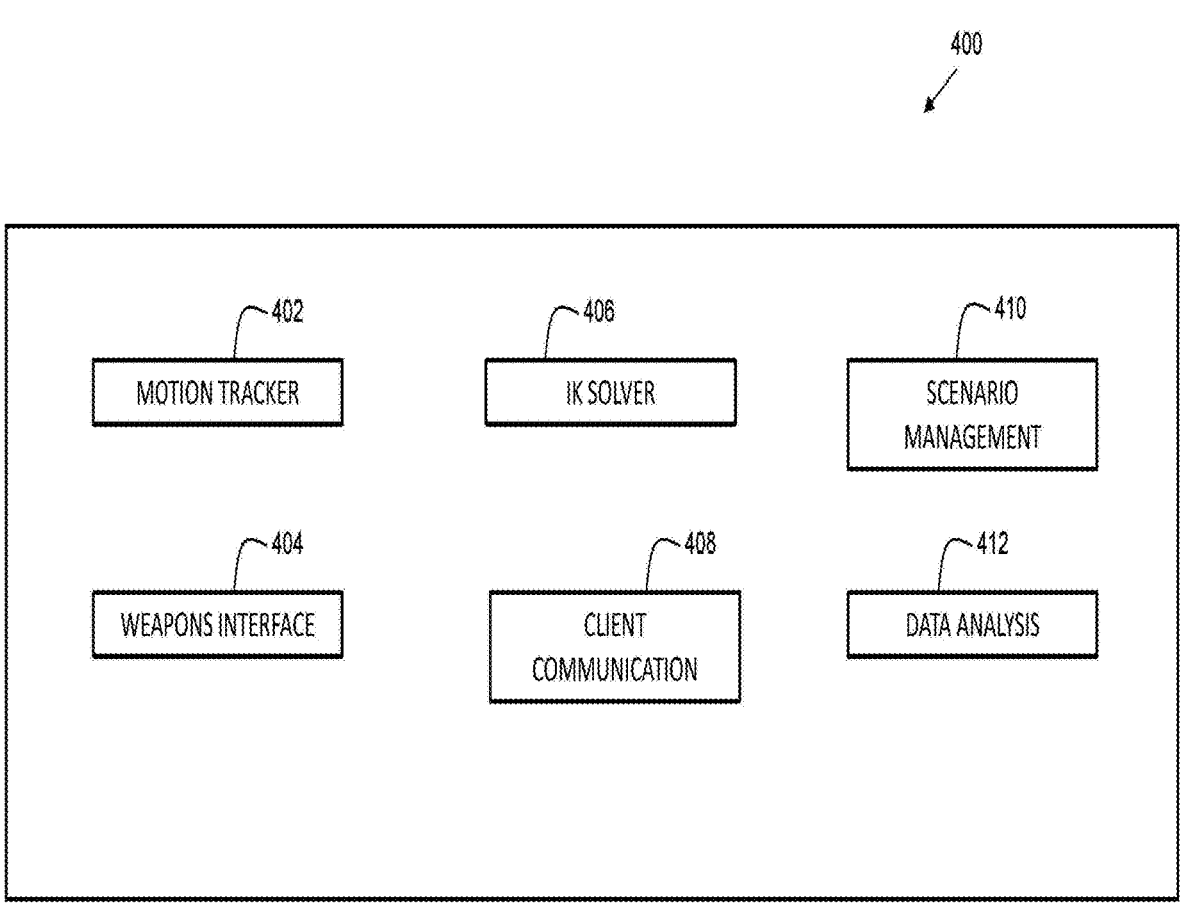
FIG. 3 is a block diagram of components in accordance with embodiments of the present invention.

FIG. 3 is a block diagram 400 of components in accordance with embodiments of the present invention. Components include, but are not limited to, motion tracker 402, weapons interface 404, inverse kinematic solver 406, client communication component 408, scenario management component 410, and/or data analysis 412. The motion tracker 402 may be a commercially available motion tracker such as OptiTrack™ by NatrualPoint, of Corvallis, Oregon. The motion tracker 402 may include multiple cameras installed within a room, building, or other venue where a scenario is to be executed. The cameras may be adapted to track wearable sensors that emit infrared light. As a user, wearing the wearable sensors moves, his/her motion is tracked b the motion tracker 402. The weapons interface 404 may implement recoil simulation, gun flash simulation, trigger activation notifications, and/or other weapons-related simulation functions. The inverse kinematic (IK) solver 406 may be used to create an inverse kinematic solution to rotate and position links in a chain. This can be used to model human movement to create virtual targets and/or model the motion of live users.

The scenario management component 410 may be implemented as a computer system such as system 102 of FIG. 1. Alternatively, the scenario management component 410 may be implemented as multiple computers in a distributed or cloud computing environment. The scenario management component may be used for generating scenarios, executing scenarios, and/or playback of previously executed scenarios. The data analysis component 412 may be used for analyzing an executed scenario. This can include performing numerous assessments on users that are tracked by the motion tracker 402. Assessments can include reaction time, location analysis, physiological orientation of the user, orientation of the user's head, eye gaze, limb position, and others.

For example, in a given scenario, upon hearing a gunshot, a user may be trained to drop to a crouched position, turn his head towards the direction of the gunshots, and draw his weapon. To provide a training experience for a user, a scenario is executed by the scenario management component 410. This component may generate the virtual environment, including audiovisual information rendered by goggles 204. A gunshot sound is rendered on the speaker of goggles 204 worn by the user, and the scenario management component 410 records this time. The user starts to move, and the motion tracker determines how long it takes to get into a crouched position, how long it takes for the user to draw his weapon, and if his head is oriented in the proper position. In embodiments, after a predetermined time (e.g. 2 seconds), the user orientation and weapon orientation are evaluated. In embodiments, a user score is generated based on the time required for the user to achieve the proper position. In this way, the user can continually practice, and review his performance to achieve an optimal reaction time. Other, more complex examples are possible, such as scenarios utilizing multiple friends and foes. In embodiments, one or more of the friends and/or foes may be virtual.

Figure 4A:
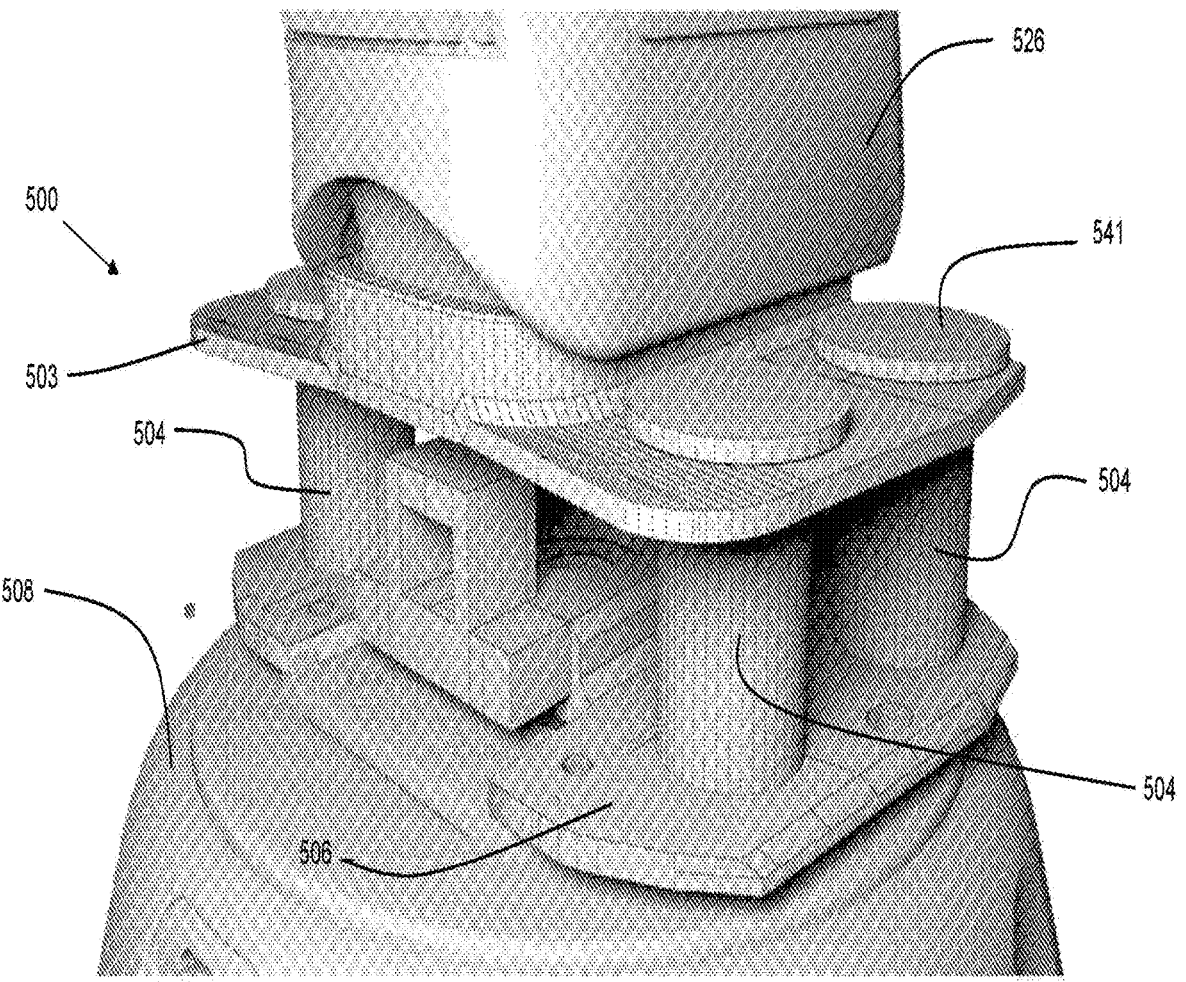
FIGS. 4A-4D show a shock mount in accordance with embodiments of the present invention.
Figure 4B:
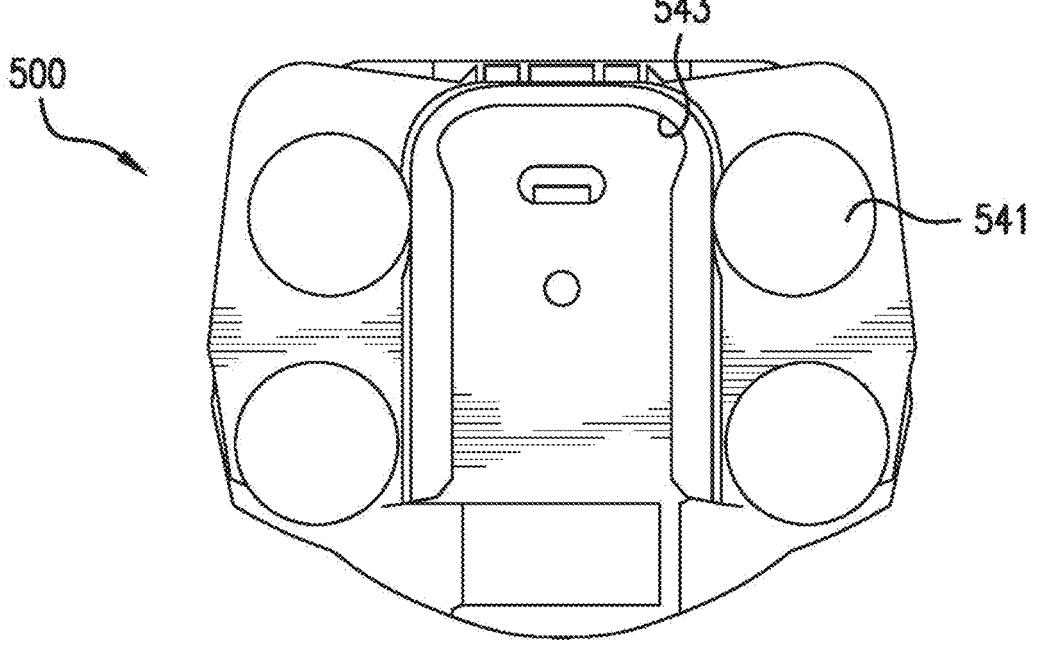
Figure 4C:
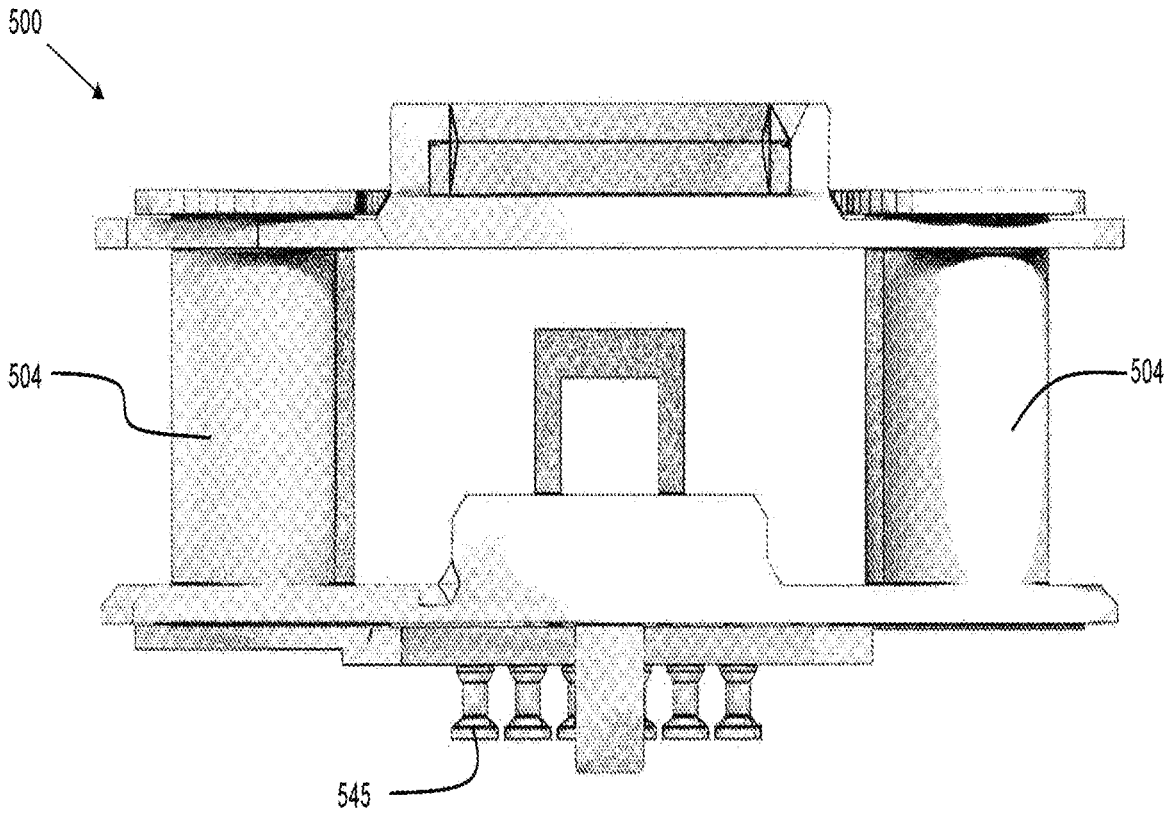
Figure 4D:
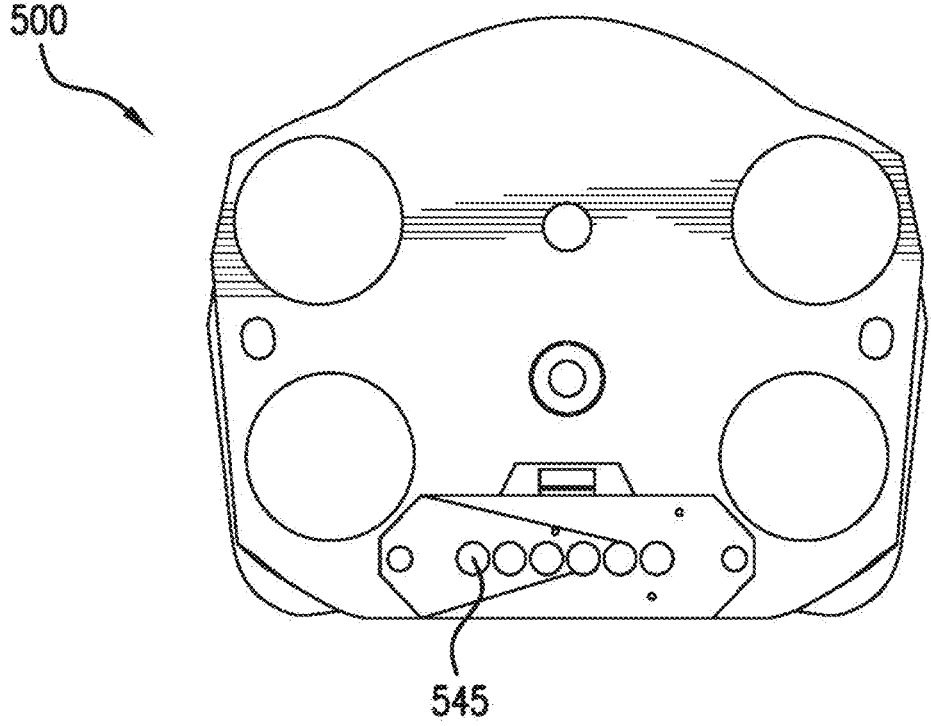

FIG. 4A-4D show a shock mount in accordance with embodiments of the present invention. FIG. 4A is a perspective view of a shock mount 500 in accordance with embodiments of the present invention. Shock mount 500 includes a top plate 503, a bottom plate 506, and a plurality of resilient members 504 configured and disposed between the top plate 503 and the bottom plate 506, and terminated at the top with end caps, indicated generally as 541. This reduces the amount of shock imparted to the inertial tracker 508 from the handle 526 of a weapon simulator as a result of a recoil simulation. The weapon simulator may utilize compressed air, solenoids, springs, or other electromechanical mechanisms to simulate a recoil that occurs when a firearm is discharged. The shock mount 500 reduces the shock imparted on the inertial tracker 508, which helps improve the reliability of data returned by the inertial tracker. In embodiments, the inertial tracker may be a commercially available inertial tracker such as Vive™ tracker by HTC corporation. In some embodiments, the resiliency of the resilient members 504 may be adjustable to accommodate different types of weapon simulators and/or inertial trackers. Shock mount 500 may be similar to shock mount 210 shown in FIG. 1. FIG. 4B is a top view of the shock mount 500, illustrating the mounting shoe 543 configured and disposed to receive a weapon simulator. FIG. 4C is a front view of the shock mount 500, illustrating a plurality of coupling pins 545 for interfacing to an inertial tracker. In embodiments, the coupling pins 545 may be spring loaded "Pogo" pins. FIG. 4D is a bottom view of the shock mount 500, indicating a linear arrangement of the coupling pins 545.

Figure 5:
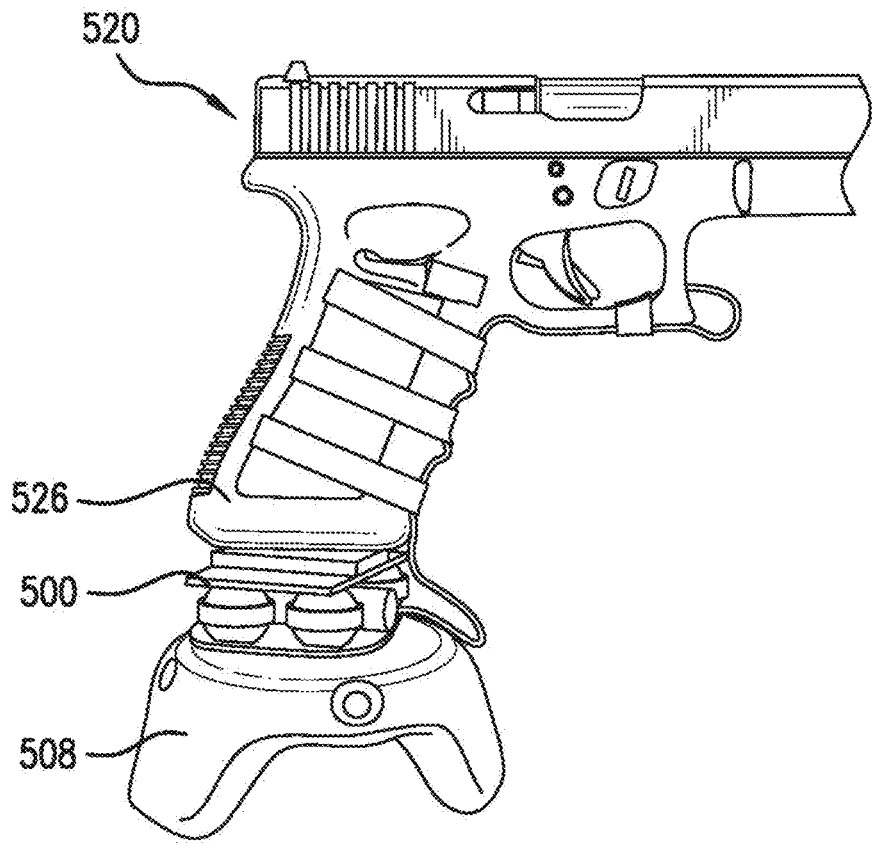
FIG. 5 illustrates an example of a shock mount in use.

FIG. 5 illustrates an example of a shock mount in use. A weapon simulator 520 has a handle 526. In embodiments, the weapon simulator 520 may be in the form factor of a pistol. The shock mount 500 is affixed to the bottom of the handle (grip) 526. The inertial tracker 508 is affixed to the shock mount 500. The weapon simulator 520 shown is a Glock simulator. In embodiments, the weapon simulator 520 is configured to use compressed gas in order to create haptic feedback (or recoil) that creates a strong vibration to the inertial tracker 508 tracker. The shock mount 500 of disclosed embodiments connects the inertial tracker 508 to the handle 526 while also reducing the shock from simulated recoil which could possibly ruin the tracking data of the inertial tracker 508. In embodiments, a small pressure-sensitive button is placed behind the trigger to send the trigger activation information through electronic circuitry that connects to an interface of the inertial tracker. The inertial tracker may then use a wireless interface such as Bluetooth™ to send the trigger activation signal to the computer for further processing.

Figure 6:
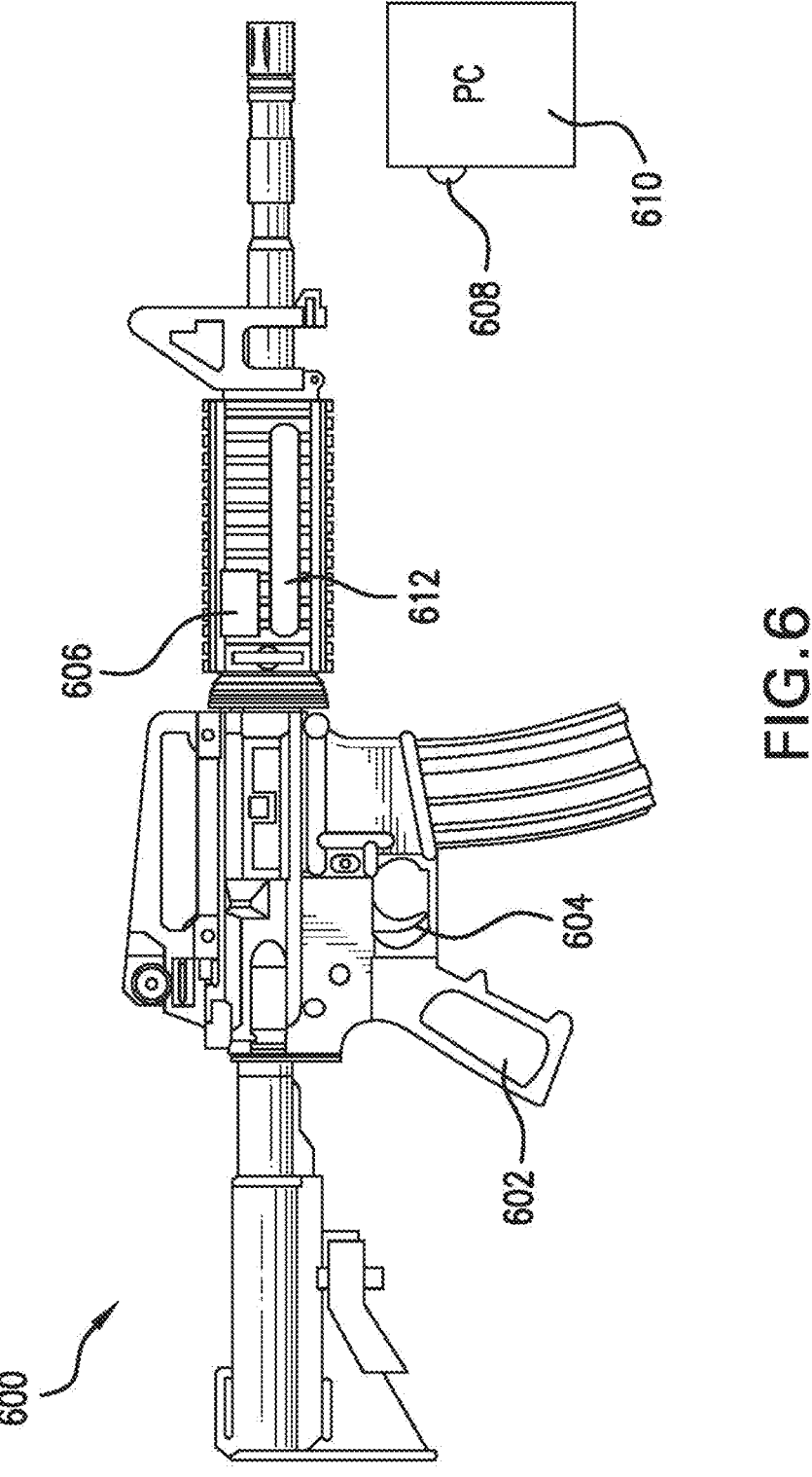
FIG. 6 illustrates a weapon simulator in accordance with embodiments of the present invention.

FIG. 6 illustrates a weapon simulator 600 in accordance with embodiments of the present invention. Weapon simulator 600 is in the form factor of an automatic rifle. A motor 602 embedded in the grip is configured to generate haptic feedback upon activation of the trigger 604. A battery 612 in the stock of the weapon simulator 600 provides power for the motor 602. Additionally, a wireless transmitter 606 is configured and disposed to provide discharge information to the scenario management system. The wireless transmitter 606 may communicate with a wireless receiver 608 attached to a computer 610. In embodiments, computer 610 is part of the scenario management system. Thus, embodiments include a communication module configured and disposed to wirelessly transmit a trigger indication to the scenario management system in response to activation of the trigger.

Figure 7:
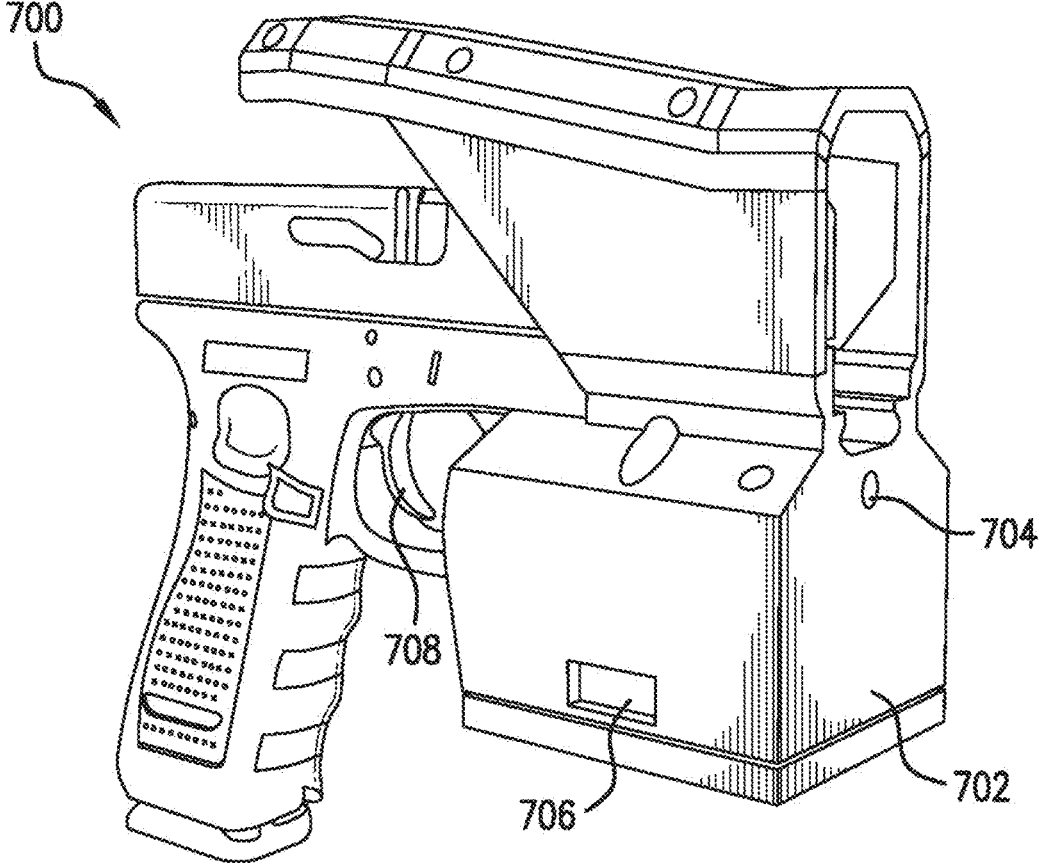
FIG. 7 illustrates a weapon simulator in accordance with additional embodiments of the present invention.

FIG. 7 illustrates a weapon simulator 700 in accordance with additional embodiments of the present invention. Weapon simulator may be in the form factor of a pistol. An optical tracker 702 may be installed on the weapon simulator 700. One or more light sources, indicated as 704 and 706 may be tracked by the motion tracking system to provide information on the position and/or orientation of the weapon simulator to the scenario management system.

In embodiments, the tracker 702 orients one or more LEDs in specific locations for optimal tracking. A pressure sensitive button is placed behind the handgun trigger and that passes a signal to a computer via a wireless communication protocol such as Bluetooth™, WiFi, Zigbee, or other suitable protocol upon activation of the trigger 708 of the weapon simulator. In embodiments, the unit is self-contained with its own LIPO battery, voltage converter, charger port, and on/off button.

Figure 8A:
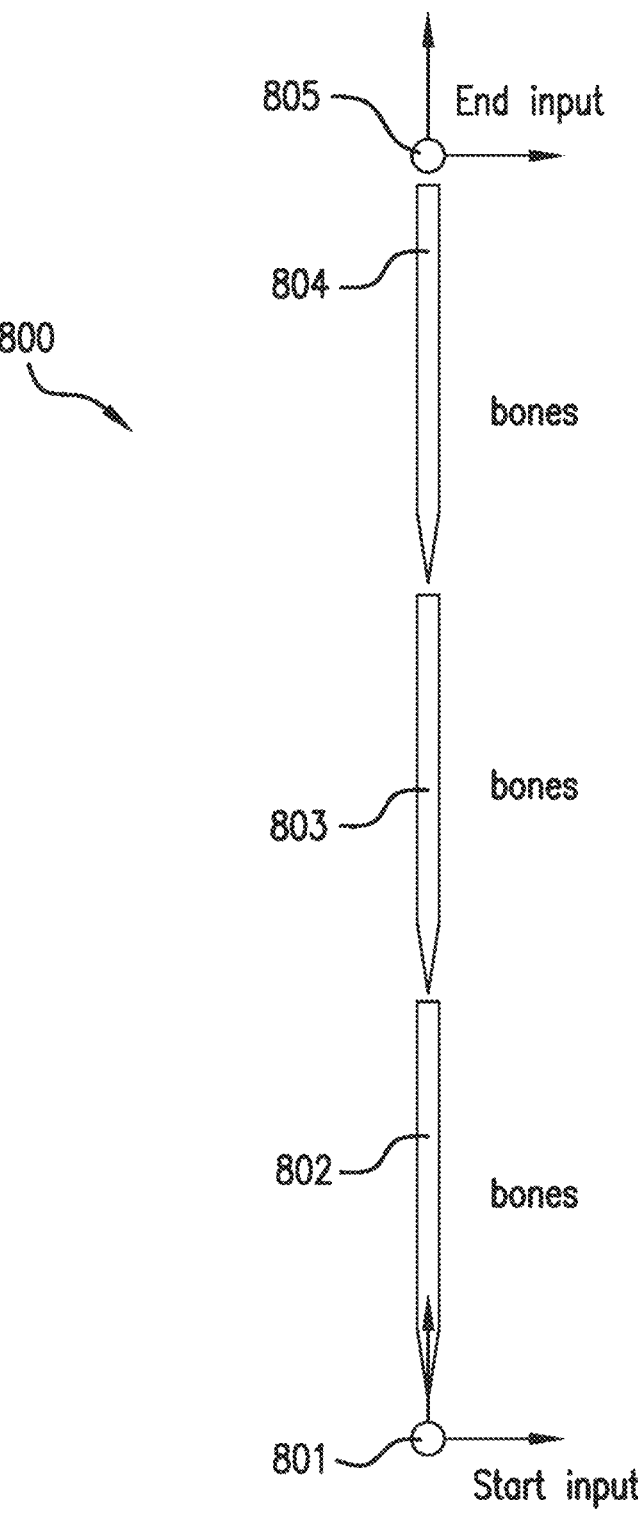
FIGS. 8A-8i illustrate examples of inverse kinematic solver computations.

FIGS. 8A-8i illustrate examples of inverse kinematic solver computations. In embodiments, a full body IK solver allows animation of a human body model in real time based on animations of 5 control points. In embodiments, a body skeleton is divided into the following five bone chains. A spine chain starts with a pelvis bone and ends with a head bone. A left leg chain starts with a pelvis bone and ends with a left foot bone. A right leg chain starts with a pelvis bone and ends with a right foot bone. A left arm chain starts with a left shoulder bone and ends with a left palm bone. A right arm chain starts with a right shoulder bone and ends with a right palm bone. Each chain of bones is solved using a Backward/Forward IK solver gets as an input, two 3D matrices and calculates transform of bones in a chain in 3D space. Changing locations or rotations of either start or end input will change transformation of the bones in the chain. Each chain can consist of any number of bones. Referring now to FIG. 8A, a bone chain 800 is shown in an extended bone state. Three bones (802, 803, and 804) are extended fully such that endpoint 801 and endpoint 805 are at a maximum possible distance.

Figures 8B, 8C, 8D:
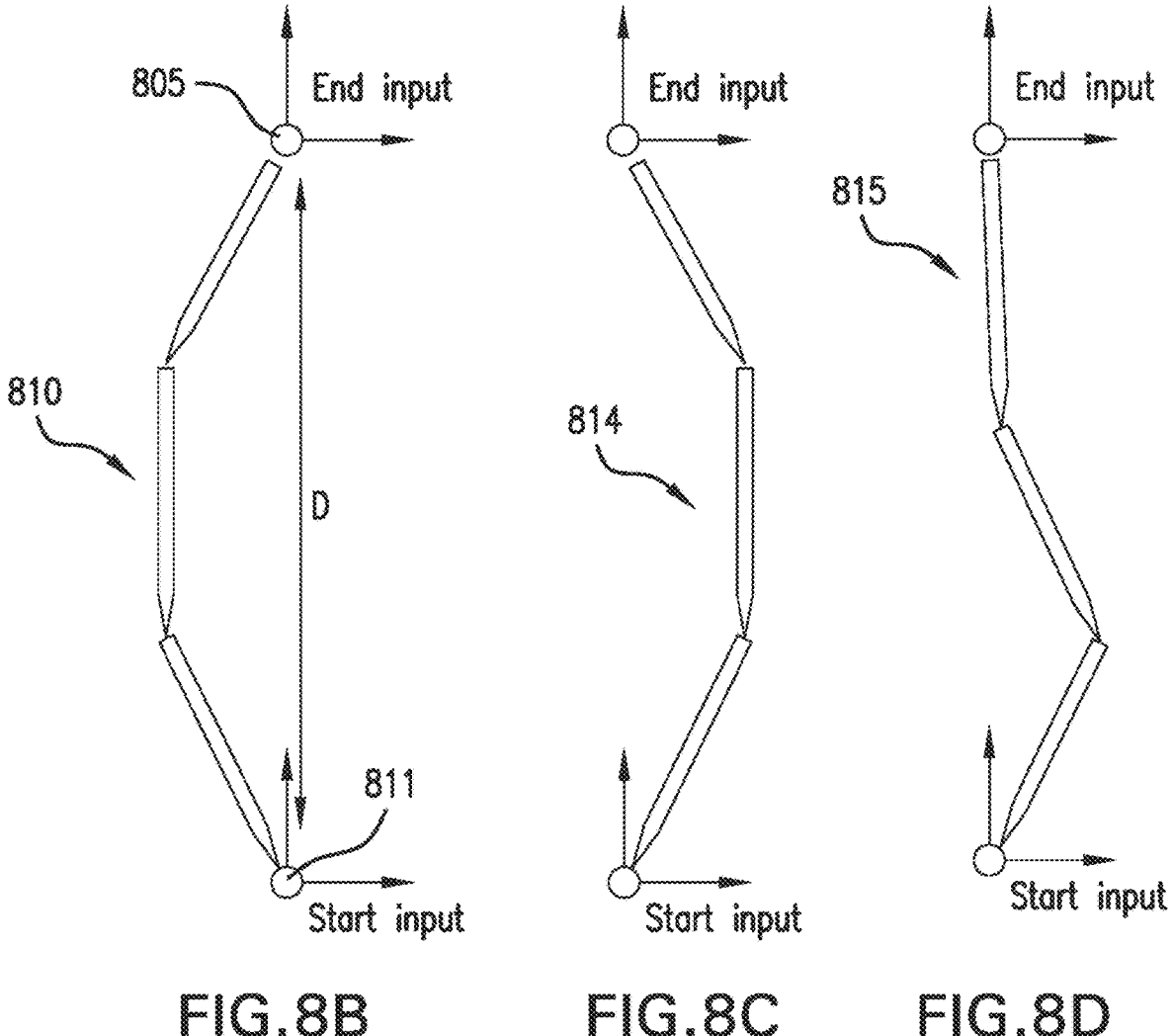

Referring now to FIGS. 8B, 8C, and 8D, there are shown examples of non-extended bone states. Referring to FIG. 8B, bone chain 810 is oriented such that the distance D between first endpoint (start) 811 and second endpoint (end) 812 is less than the sum of the lengths of all bones in the bone chain. A similar case exists for bone chain 814 of FIG. 8C and bone chain 815 of FIG. 8D.

Figure 8E:
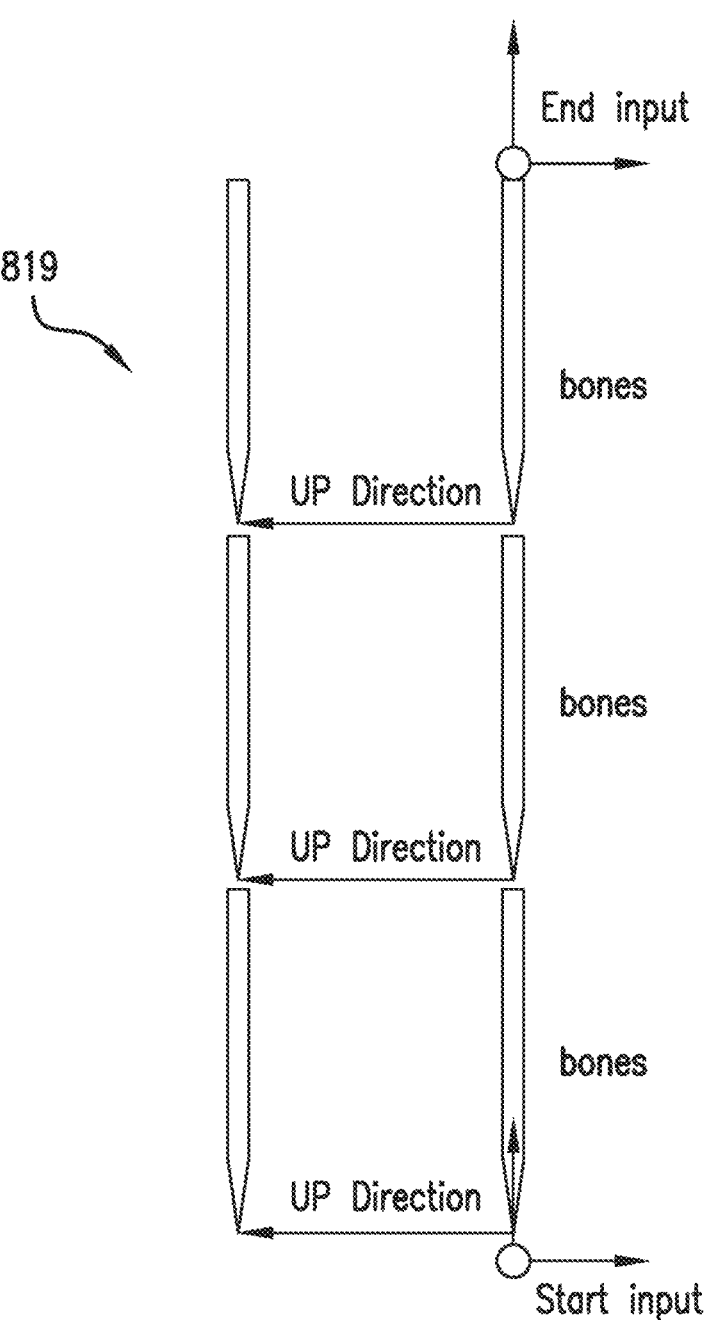

Referring now to FIG. 8E there is a bone chain with a force vector UP applied to it. In order to bend the chain in the known direction, the UP direction has to be defined for the chain. UP direction is a 3D vector. UP direction gets applied to the initial pose and changes it. In the diagram, the UP direction is to the left, which means the chain 819 will bend to the right.

Figure 8F:
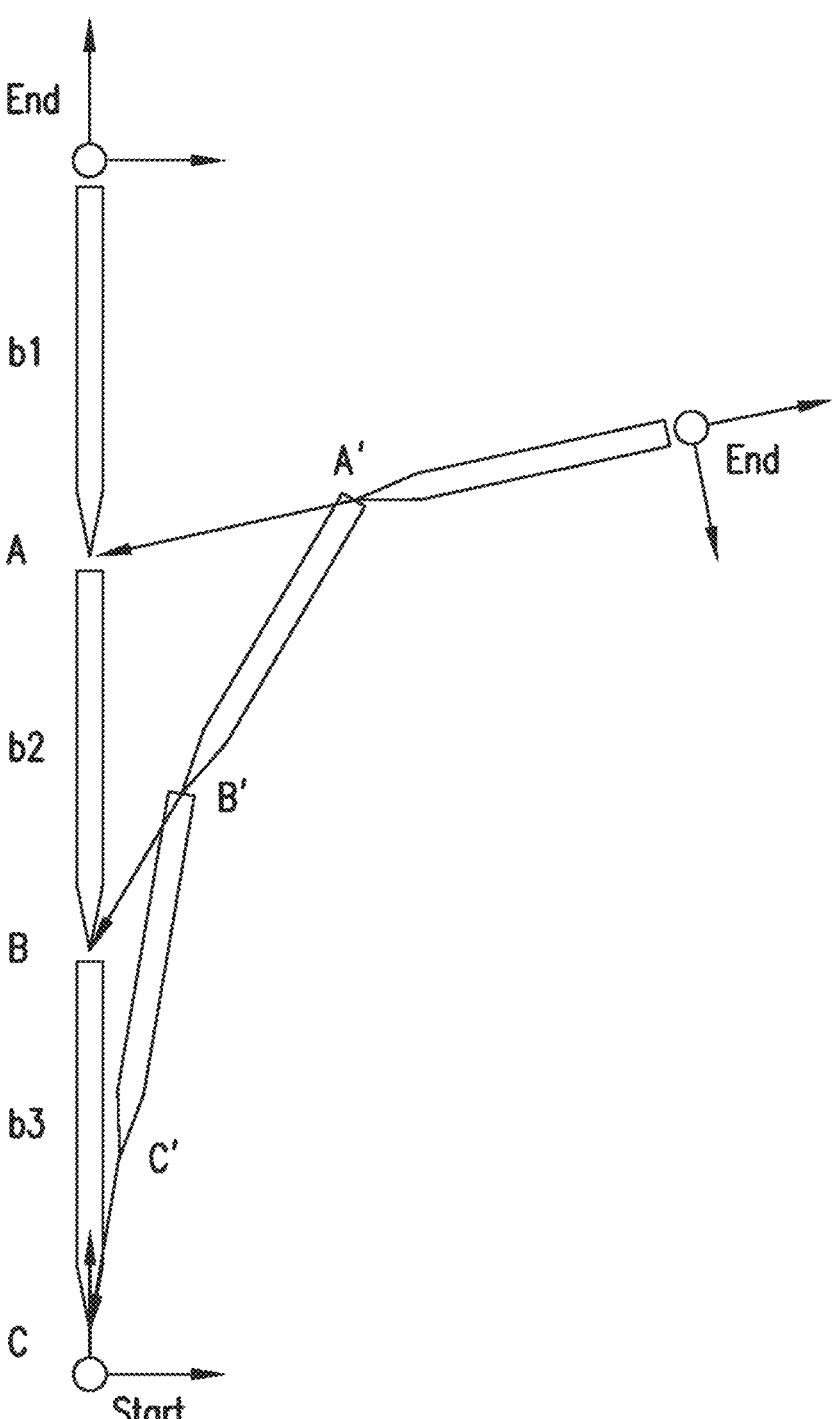

Referring now to FIG. 8F, forward solving computations are shown. Starting from the current state of the chain, positions of each bone in the chain are found using the forward solving equation:

$$A'=End'-(End'-A)$$

Starting from the bone closest to the end, this equation is repeated for each bone by replacing End' vector with the location of previous bone in the chain.

For finding B' for example, the following equation is used:

$$B'=A'-(A'-B)$$

Similarly, for C':

$$C'=B'-(B'-C)$$

Figure 8G:
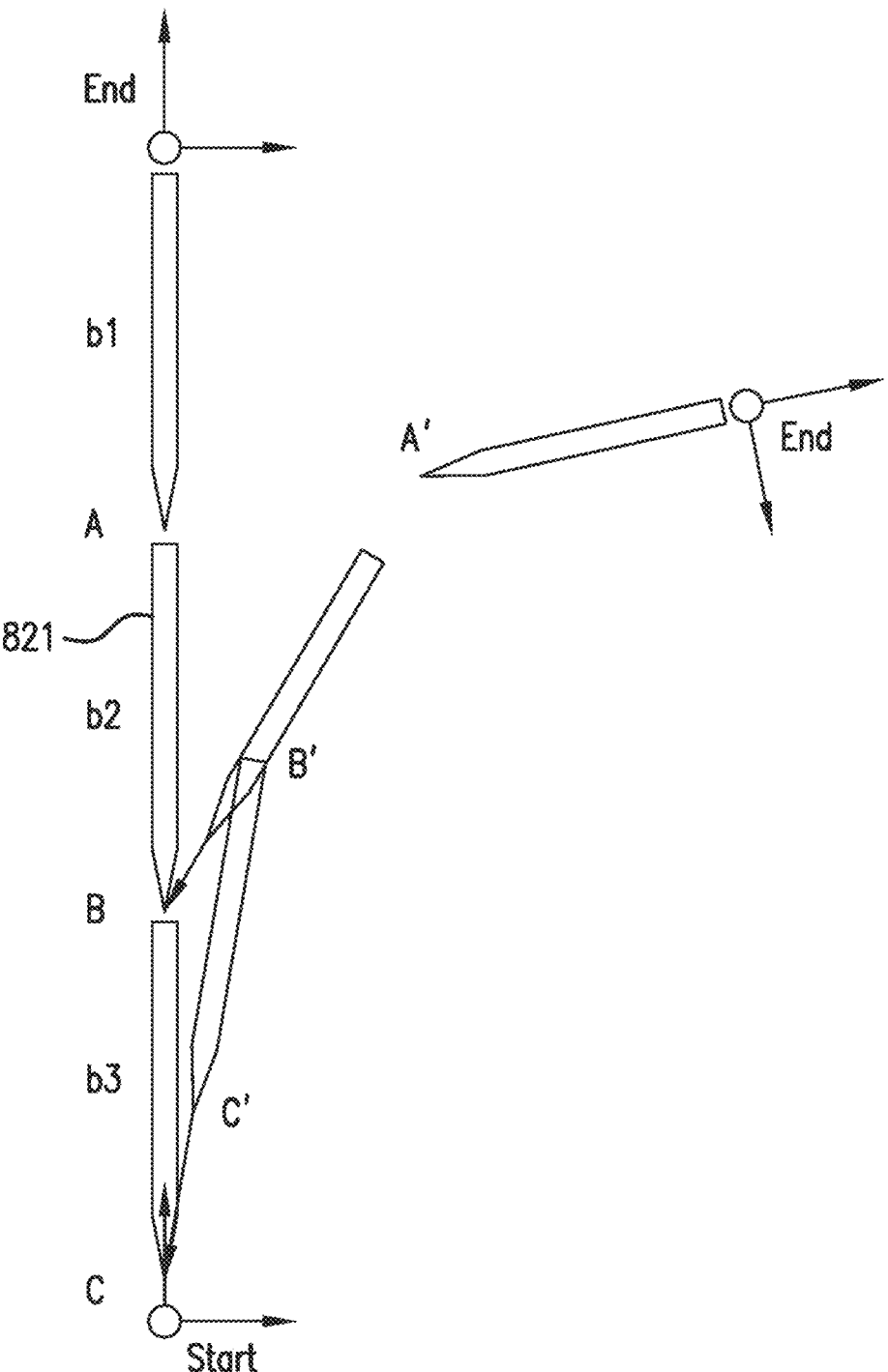

Referring now to FIG. 8G. a chain rigidity factor is applied. In embodiments, each bone has a rigidity factor which determines how easily a given bone will change its position when start or end transforms change. A value from 0 to 1 determines where the bone will be placed between the initial pose and the current pose. In this example, bone 821 has a rigidity factor of 0.5 and so it is moved to halfway between points B and B'.

Figure 8H:
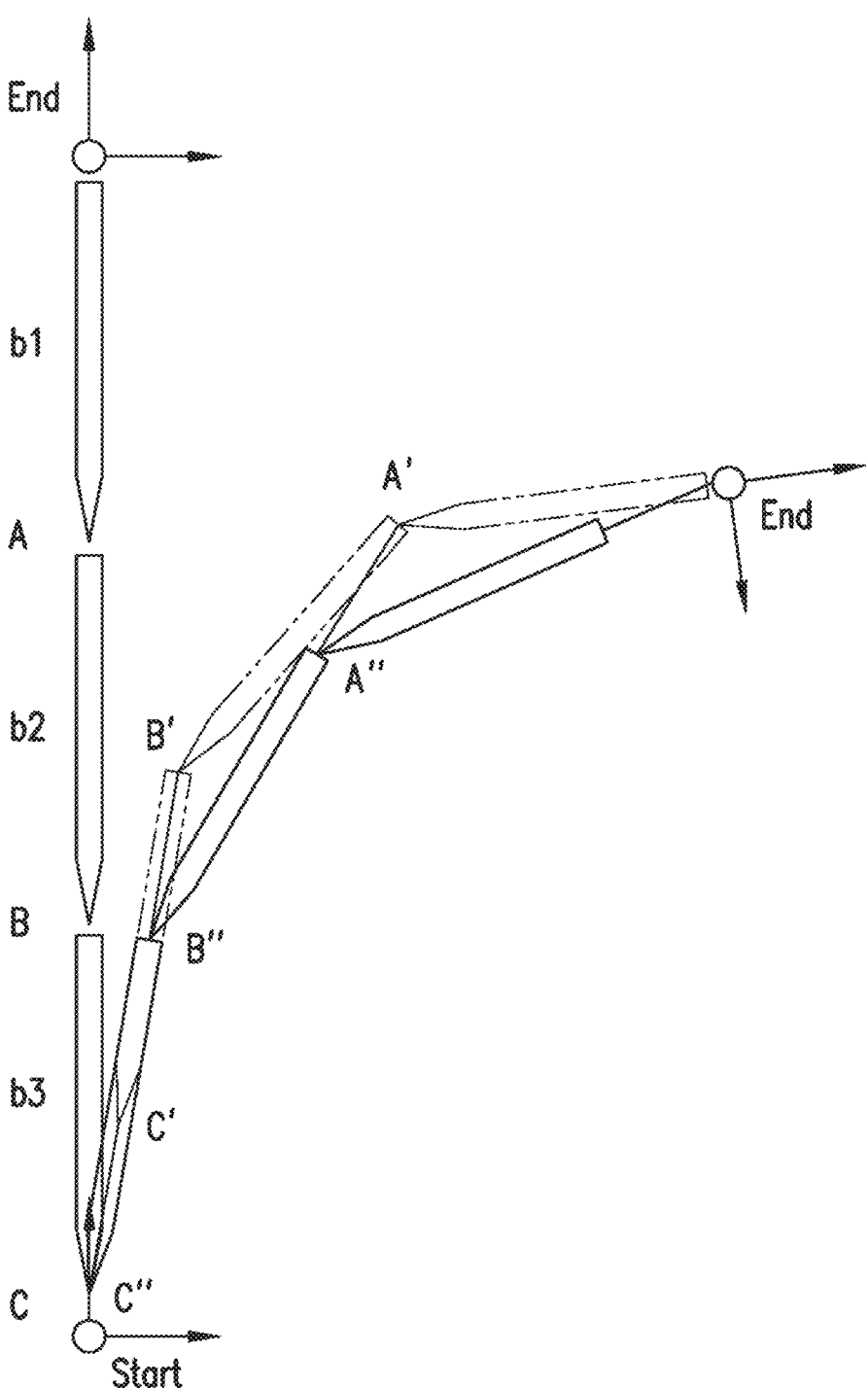

Referring now to FIG. 8H, backward solving is performed. Starting from the current state of the chain, positions of each bone in the chain are found using a backward solving equation. The process starts from the bone closest to the start input, and the equations below are applied:

$$C''=C$$

$$B''=C''+(B'-C'')$$

$$A''=B''+(A'-B'')$$

Figure 8I:
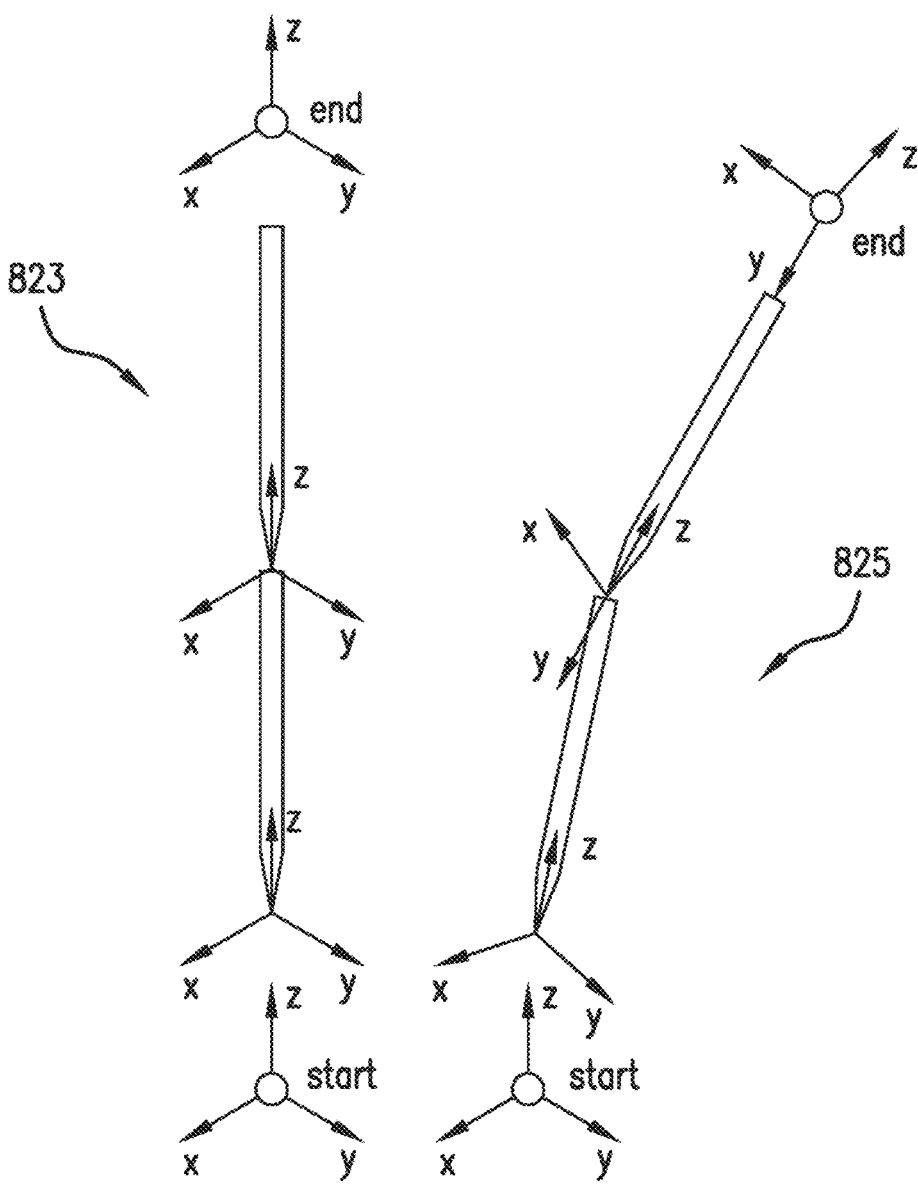

Referring now to FIG. 8i, the orientation of the bones is calculated. Bone chain 823 shows an initial position, and bone chain 825 shows a final position. In embodiments, orientation of the bones gets calculated after positions are solved for, and it is known where each bone is located and where this bone was in the initial pose. In embodiments, in the initial pose a rotational matrix is constructed for each bone. In the solved pose there is constructed a new rotational matrix for each bone using the same axis order. One axis is parallel to the length of the bone (Z in the diagram). A second axis is linearly interpolated between the upnode (UP) chain vector multiplied by start and upnode chain vector multiplied by end transform (Y in the diagram).

Linear interpolation of this axis allows simulation of twisting of bones along their long axis (z) if end or start transform is twisted. This approach allows adjusting of the extent of the twist for each bone easily by changing one numeric value. Once there are derived two rotational matrices for the bone, then the offset between them is calculated and this transform offset is applied to the bone. This approach allows rotation of bones independently of their initial orientation. Orientation of bones can be inconsistent in the initial chain pose.

Figure 9A:
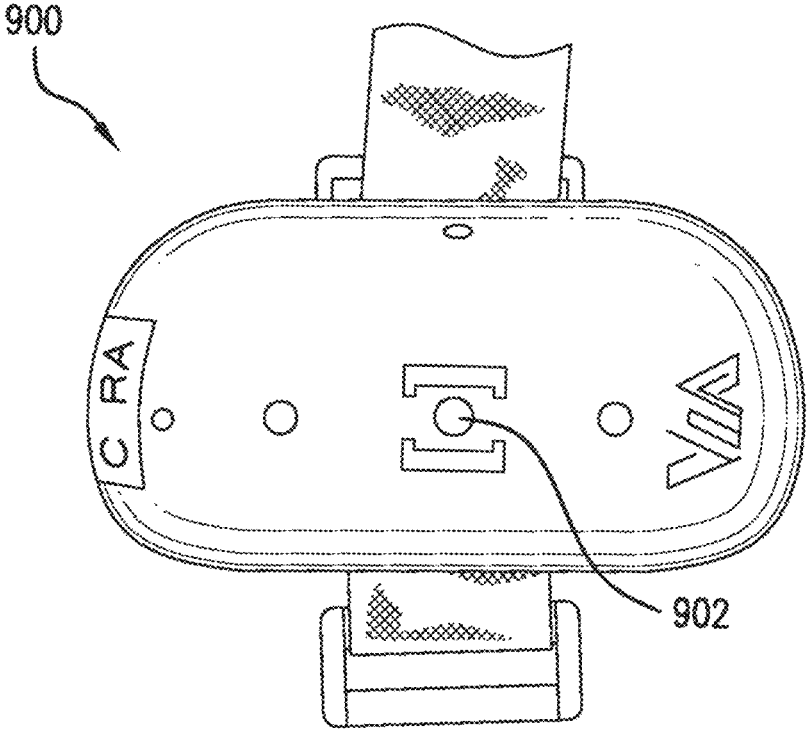
FIG. 9A is a front view of a wearable sensor in accordance with embodiments of the present invention.

FIG. 9A is a front view of a wearable sensor 900 in accordance with embodiments of the present invention. Wearable sensor 900 includes light emitting diode 902 installed therein. A battery within the sensor (not shown) applied power to the light emitting diode 902. In embodiments, the light emitting diode (LED) 902 emits infrared light and does not emit substantial visible light. This allows the LED 902 of sensor 900 to be detected by the motion tracking system, and yet not be noticeable to the users.

Figure 9B:
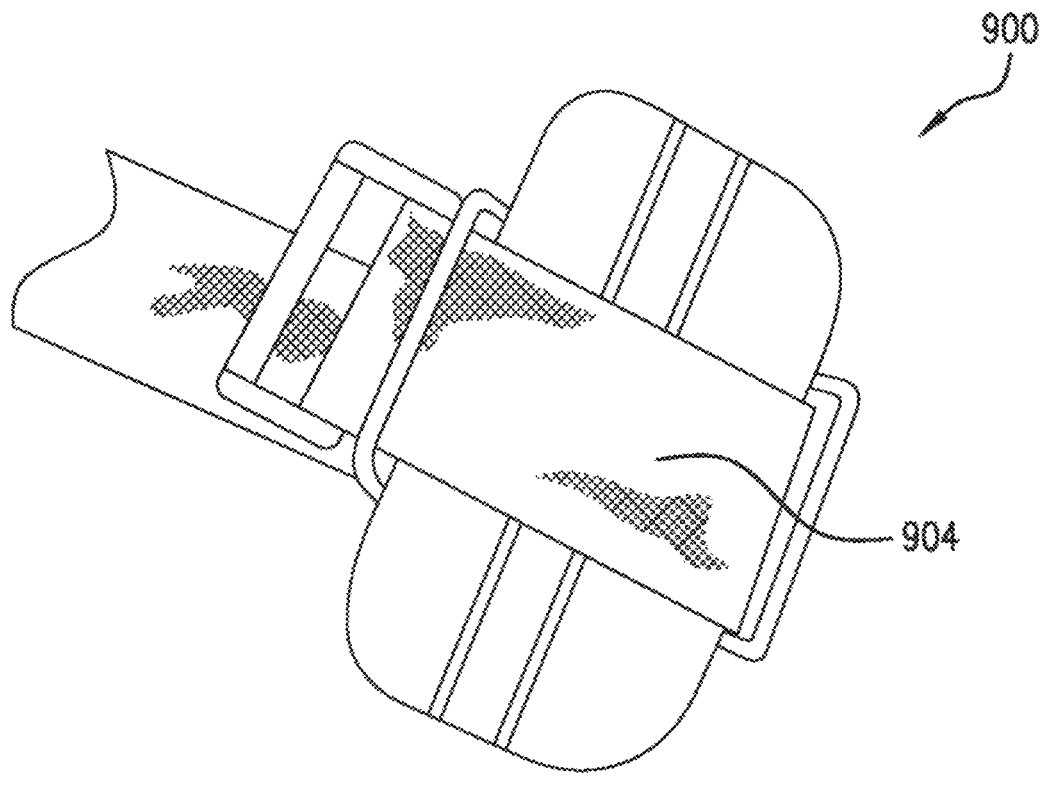
FIG. 9B is a rear view of the wearable sensor of FIG. 9A.

FIG. 9B is a rear view of the wearable sensor 900 of FIG. 9A. In this view, the adjustable strap 904 can be seen. This strap 904 is used to secure the wearable sensor around a limb (arm, leg) of a user. In embodiments, the strap 904 may have a fastener such as a snap, hook and loop fastener, or other suitable fastening mechanism. Wearable sensor 900 may be similar to sensors 206 shown in FIG. 1.

Figure 10:
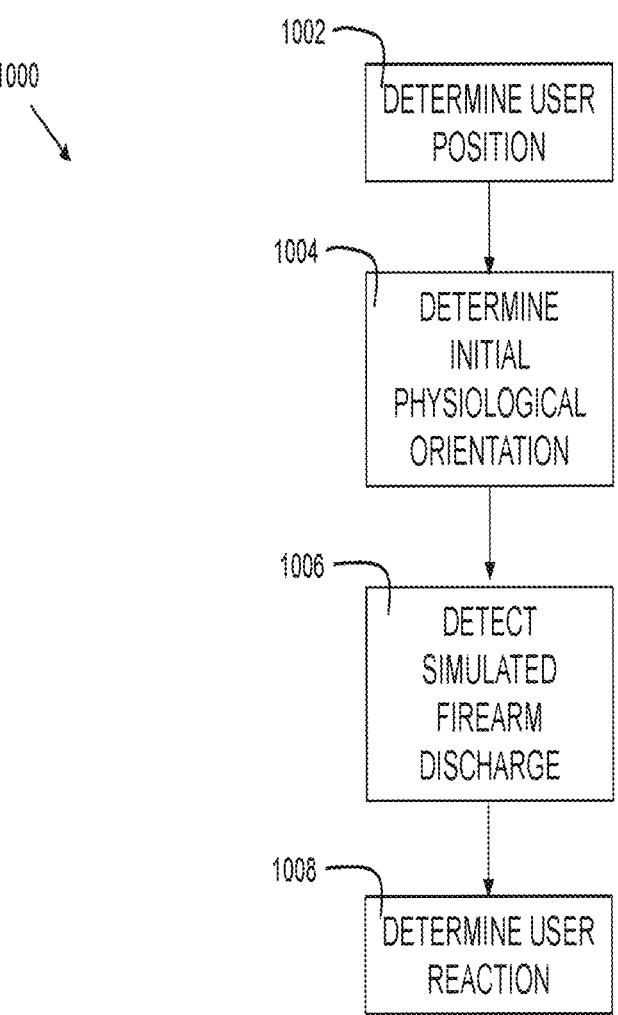
FIG. 10 is a flowchart indicating process steps for embodiments of the present invention.

FIG. 10 is a flowchart 1000 indicating process steps for embodiments of the present invention. At process step 1002, a user position is determined. The user may be wearing one or more wearable devices such as position sensors and/or position indicators. The wearable devices may emit infrared light that is tracked by a motion tracking system. In process step 1004, an initial physiological orientation is determined. In some embodiments, a wearable device is worn on each limb, allowing the motion tracking system to determine physiological orientation. The physiological orientation can include a stance (e.g. standing, crouching, prone), and may further including a direction the user is facing. In process step 1006, a simulated firearm discharge is detected. In embodiments, this can include a weapon simulator in the form factor of a firearm. The weapon simulator includes a power source (battery) and a wireless transmitter that is configured and disposed to transmit a trigger activation indication to a computer to indicate that the weapon simulator has discharged (e.g. a user pulled the trigger on the weapon simulator).

The weapon simulator may or may not actually shoot a projectile. In process step 1008, a user reaction is determined. This can include determining a second physiological orientation of the user at some predetermined time after the detection of the simulated firearm discharge. The second physiological orientation can include a position of a person, position of the limbs of that person, orientation of the torso of the person (which way the torso is facing), and/or orientation of the head of the person (which way the head of the user is facing). Thus, in embodiments, determining a physiological orientation of the user comprises determining a facial direction of the user.

Additionally, in embodiments with a user-facing camera (e.g. included in virtual or augmented reality goggles), an eye gaze direction may further be included in the physiological orientation. Various attributes can then be evaluated, including, but not limited to, the time required for the user to achieve the second physiological orientation (e.g. a measure of how long did it take the user to get into a crouch position in response to hearing and/or seeing a simulated firearm discharge), the correctness of the second physiological orientation as compared to a known orientation (e.g. a measure of if the user's crouch is sufficiently low), and/or the time required to draw a weapon (e.g. a measure of the time required for the user to pull a weapon simulator from a holster and orient it in a position to fire). Other attributes of user reaction may be evaluated instead of, or in addition to the aforementioned attributes in embodiments of the present invention.

FIG. 11 is a flowchart 1100 indicating additional process steps for embodiments of the present invention. In process step 1102, a final position time is determined. This may include determining a time where the user's level of motion is below a predetermined threshold. Thus, embodiments include further comprising measuring a duration from a time of the simulated firearm discharge to a time of detecting the determined physiological orientation. As an example, when a user is in the process of quickly moving from a standing position to a crouched position, there is a relatively large amount of motion. Once the user is stabilized in the crouched position, there is relatively less motion. The time when the user is substantially still may be recorded as a final position time. At process step 1104, a final position quality is determined. This may include utilization of motion tracking data to determine how close the user's physiological orientation is to an expected physiological orientation. This can include an assessment of if the user is in a proper stance/position, facing the proper direction, appropriately drawing his weapon simulator, and/or other factors. In process step 1106, the final position time is compared to average times. In process step 1108, a score is generated based on the comparison to the average time. In some embodiments, the score may be generated using the formula:

$$K(1-X)$$

Where:
K is a constant;
X is the final position time in seconds.

As an example, if an average time for a law enforcement professional to go from standing to crouched is 400 milliseconds, then the final position time may be compared against the average time using the above formula. If K is 116, then the following score is achieved for different crouch times:

| Crouch time (milliseconds) | Score |
|---|---|
| 400 | 69.6 |
| 500 | 50 |
| 600 | 46.4 |
| 200 | 92.8 |
| 300 | 81.2 |

As can be seen from the table above, the formula returns a score such that a user with an average time of 400 milliseconds earns a score of about 70, while a user with a score of 300 returns a higher score (81.2). Similarly, a user with a relatively slow time of 600 milliseconds returns a low score of 46.4. This concept can also be applied to other attributes, such as position quality, weapon draw time, weapon discharge time, and/or other attributes. In embodiments, the score for each attribute may be combined into an overall score.

Figure 12:
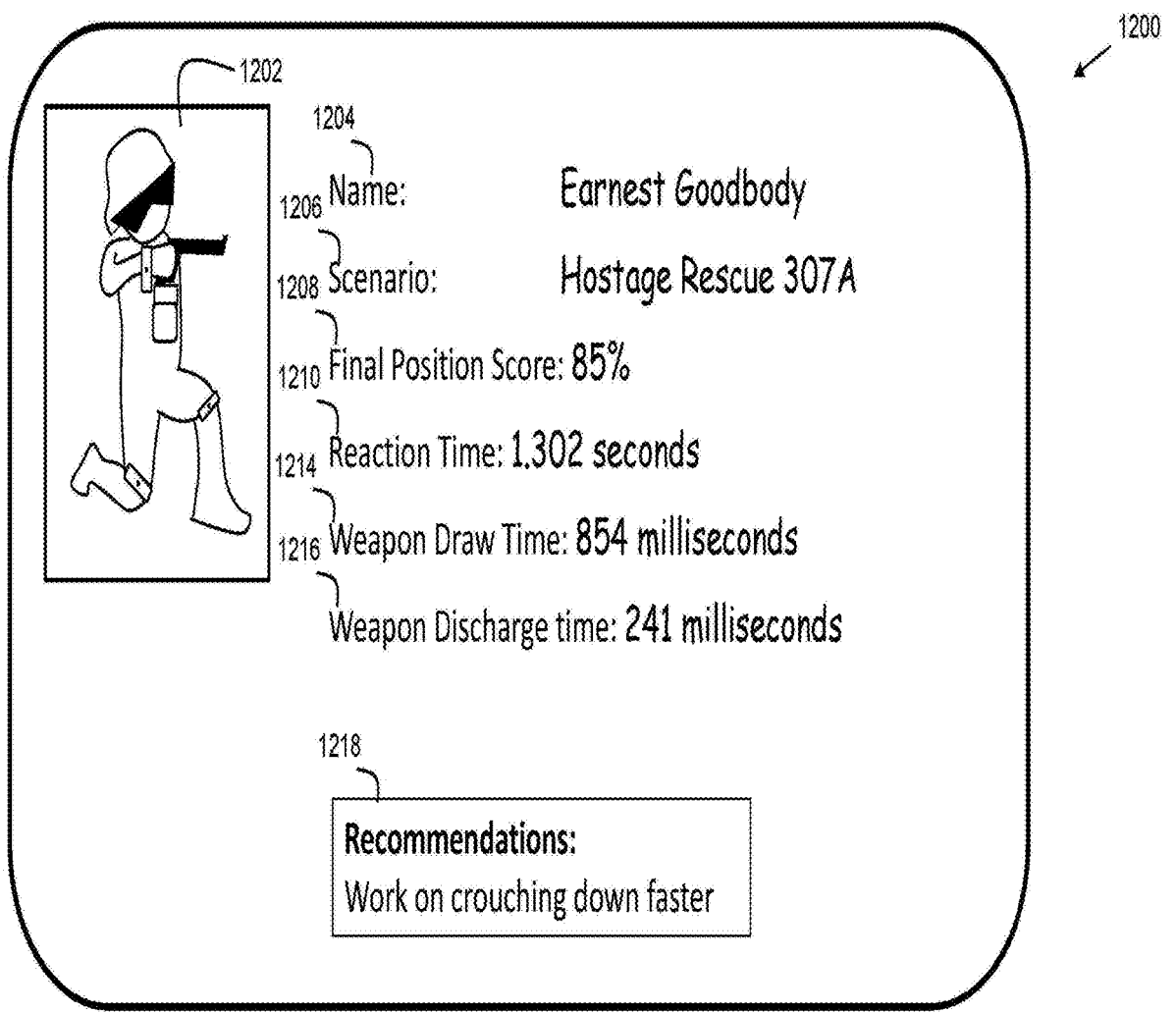
FIG. 12 is an exemplary user interface in accordance with embodiments of the present invention.

FIG. 12 is an exemplary user interface 1200 in accordance with embodiments of the present invention. User interface 1200 may be implemented on a client device such as client device 116 of FIG. 1. The user interface may be used to allow users and/or trainers and coaches to review performance. User interface 1200 includes a video window 1202 that may show video and/or a virtual animated rendition of the user performance. In some embodiments, real video and animated graphics may be composited together in video window 1202. User interface 1200 further includes a name field 1204, a scenario name 1206, a final position score 1208, a reaction time 1210, a weapon draw time 1214, and a weapon discharge time 1216. In embodiments, the weapon draw time 1216 may be the time required by the user to move his weapon simulator from a holstered position to a ready position as determined by the motion tracking system. In embodiments, the weapon discharge time may be the time required by the user to fire the weapon simulator after getting the weapon simulator into the ready position (e.g. aimed at a target). The data analysis component (412 of FIG.

3) may further provide computer-generated recommendations, which may be rendered in field 1218. The recommendations can be based on scores and/or times for one or more attributes during a scenario execution. The user interface 1200 is merely exemplary, and other user interfaces are possible showing more, fewer, or different fields in some embodiments.

Figure 13:
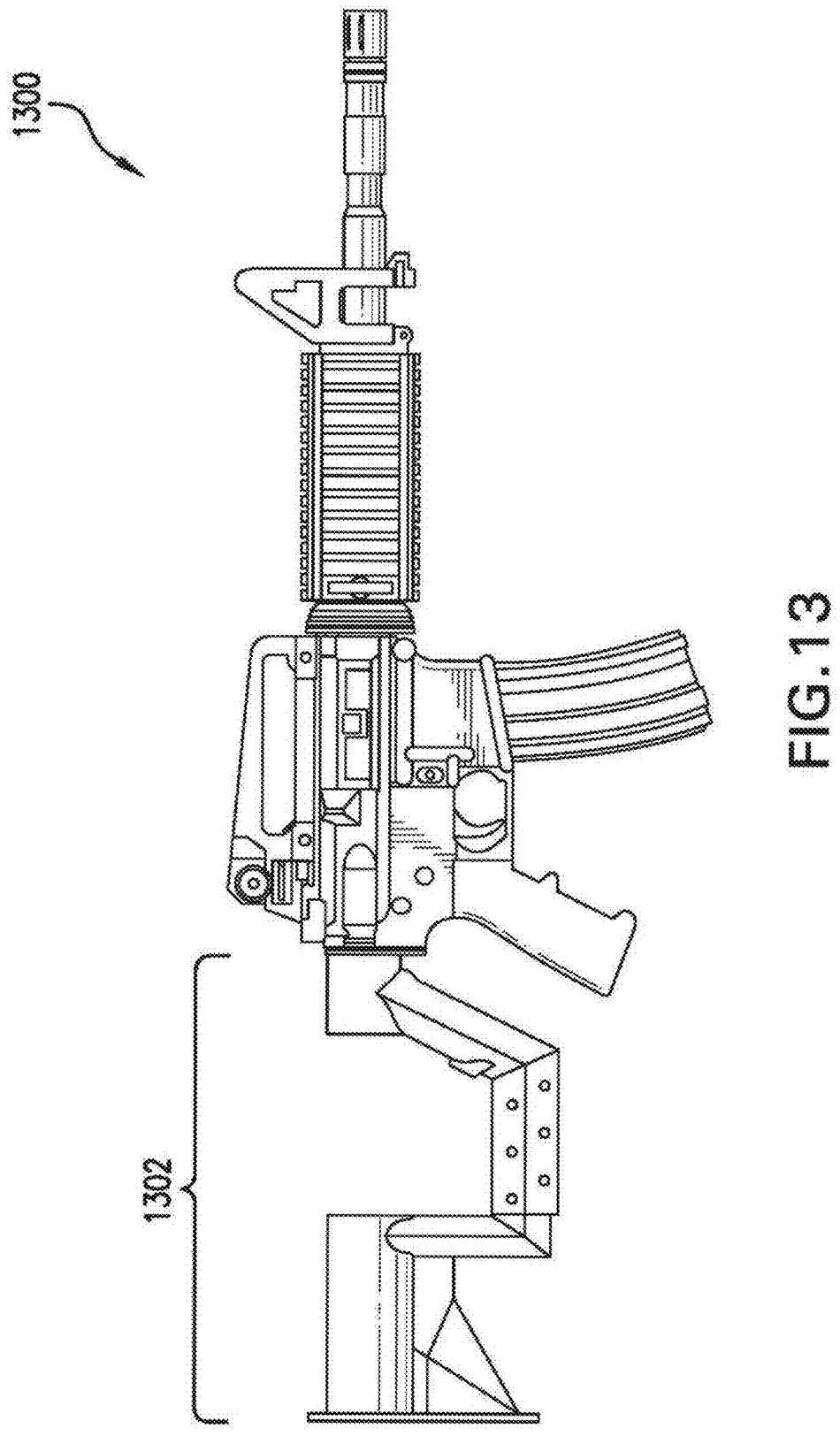
FIG. 13 shows an additional embodiment of a weapon simulator.

FIG. 13 shows an additional embodiment. Weapon simulator 1300 includes additional stock 1302 affixed to the rear end of the weapon simulator. This enables users wearing a head-mounted display (HMD) to get into a shooting position without having the HMD bump into the stock end of the weapon simulator, thereby allowing for a more unencumbered user experience.

Some embodiments may provide an untethered experience with computers mounted in backpacks. Such embodiments may include, but are not limited to, an MSR V1 with a GTX 1070, or an HP ZVR with a GTX 1070. The computers may be configured with an Intel i7 processor and at least 16 GB of RAM. Other backpack computers are possible in embodiments of the present invention.

According to another embodiment illustrated in FIGS. 14A and 14B, a computer-implemented method is provided which is executed by a system for conducting a firearm usage simulation. The method includes: assigning one or more head mounted displays (HMDs) to one or more users participating in the firearm usage simulation 1402; detecting a position of each HMD 1404; calibrating a plurality of tracked devices corresponding to each user, where the tracked devices include one or more wearable sensors and a weapon simulator 1406; determining which tracked devices correspond to which user by detecting the tracked devices that are in closest proximity to the HMD assigned to each user and associating those devices with the respective user 1408; generating an avatar corresponding to each user 1410; determining, by a motion tracker component, an initial position and subsequent motion, position, and posture of a user, where the motion tracker component comprises one or more cameras deployed in an area of the simulation, the one or more cameras being configured to track infrared light emitted from the one or more wearable sensors worn by the user 1412; determining, by the motion tracker component, the one or more wearable sensors, and a user-facing camera included within goggles worn by the user, an initial physiological orientation of the user, where a subset of the one or more wearable sensors are affixed to the HMD and are affixed to one or more limbs of the user, and where each user is represented by their corresponding avatar displayed in the simulation, and the avatar's position, posture and motion in the simulation reflects the user's position, posture and motion 1414; detecting one or more threats to the user including a weapon discharge in the simulation 1416; and determining, by a data analysis component, a reaction of the user in response to the threats and whether the user discharged their weapon simulator 1418.

According to one embodiment, participants in the firearm usage simulation are initially spaced at least one meter apart so the system can more easily determine which body sensors are closest to which HMD. A spacing of one or more meters may be a sufficient spacing for accurately determining which sensors or emitters are closest to a given HMD.

Figure 15:
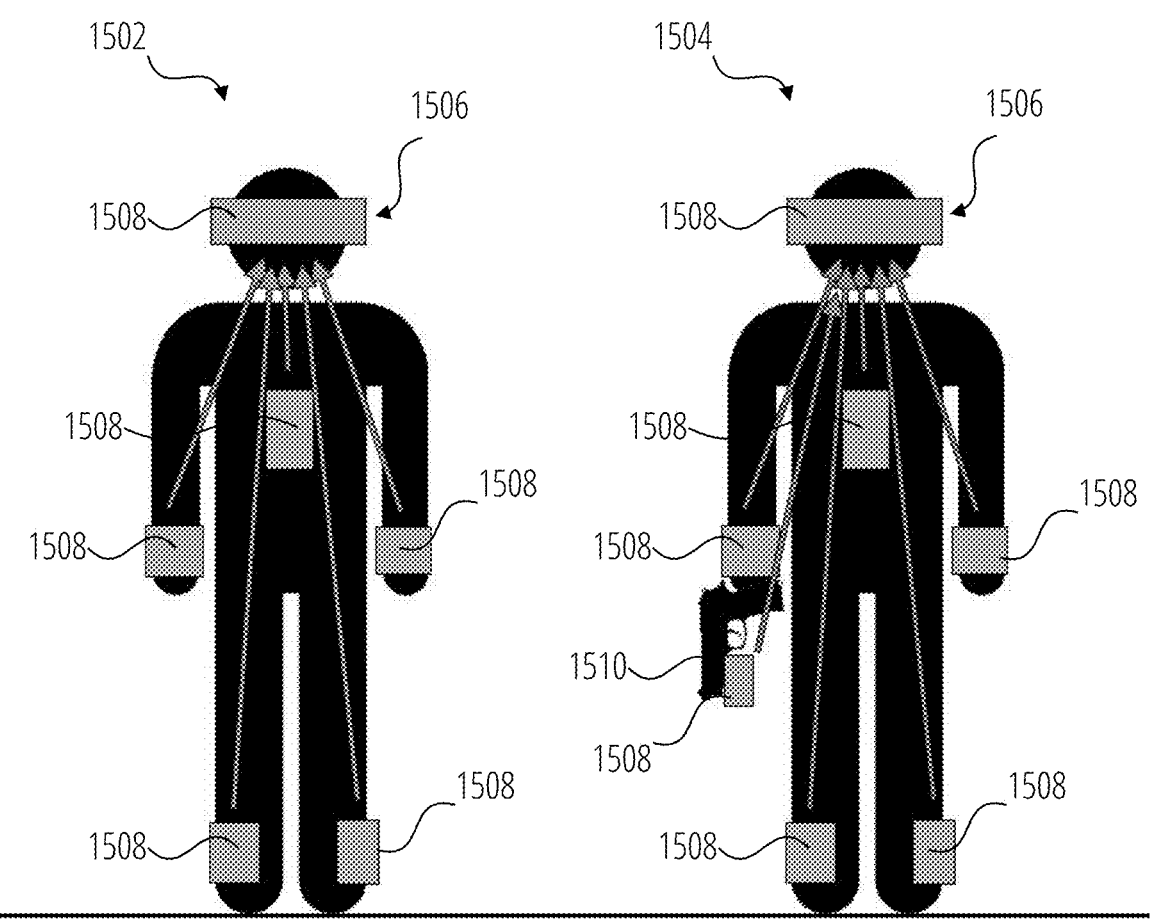
FIG. 15 shows a schematic illustration of participants in a firearm usage simulation in accordance with an embodiment of the present invention.

Turning to FIG. 15, two participants 1502 and 1504 in a firearm usage simulation are depicted. Both participants are wearing an HMD 1506 and a set of body worn sensors and/or emitters (also known as markers) 1508 attached to different parts of their body and to the HMD. For ease of reference, the body worn sensors and/or emitters will be referred to as markers. The markers each transmit one or more signals that can be tracked by the motion tracker component. The participant on the right is also carrying a weapon simulator 1510 in the form of a handgun, which includes a marker 1508 that transmits one or more signals that can be tracked. All of the markers closest to an HMD are associated with that HMD and are assigned to the participant wearing that HMD. There is therefore no need to manually assign the markers, weapon simulator, or any other trackable device since they are automatically associated with a participant based on their proximity to an HMD worn by the participant.

As can now be appreciated, disclosed embodiments provide an improved training system for firearm usage. A motion tracking system tracks the motion of one or more users. Users use a weapon simulator that integrates with a scenario management system. The scenario management system thus obtains information about weapon position and weapon discharge, as well as position of the users. The scenario management system can generate scenarios where live participants, virtual participants, and/or computer-generated targets work together or against each other to conduct training drills. Through the use of virtual reality and/or augmented reality, various landscapes, terrain, buildings, and other factors can be simulated. The reactions of users can be timed and assessed, allowing for improved review of the performance of users such as military and law enforcement personnel. In this way, the effectiveness and safety of these people can be continuously monitored and improved.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

Each of the above methods may be executed on one or more processors on one or more computer systems. Embodiments may include various forms of distributed computing, client/server computing, and cloud based computing. Further, it will be understood that the depicted steps or boxes contained in the disclosed flowcharts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Any and all such functions, generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

It will be appreciated that computer program instructions may include computer executable code. A variety of languages for expressing computer program instructions may include without limitation C, C++, Java, JavaScript™, assembly language, Perl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Furthermore, the method steps shown are intended to include any suitable method of causing one or more parties or entities to perform the steps.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method executed by a system for conducting a firearm usage simulation, comprising:

assigning one or more head mounted displays (HMDs) to one or more users participating in the firearm usage simulation;

detecting a position of each HMD;

calibrating a plurality of tracked devices corresponding to each user, wherein the tracked devices include one or more wearable sensors and a weapon simulator;

determining which tracked devices correspond to which user by detecting the tracked devices that are in closest proximity to the HMD assigned to each user and associating those devices with the respective user;

generating an avatar corresponding to each user;

determining, by a motion tracker component, an initial position and subsequent motion and posture of a user, wherein the motion tracker component comprises one or more cameras deployed in an area of the simulation, the one or more cameras being configured to track infrared light emitted from the one or more wearable sensors worn by the user;

determining, by the motion tracker component, the one or more wearable sensors, and a user-facing camera included within goggles worn by the user, an initial physiological orientation of the user, wherein a subset of the one or more wearable sensors are affixed to the HMD and are affixed to one or more limbs of the user, wherein each user is represented by their corresponding avatar in the simulation, wherein the avatar's position, posture and motion in the simulation reflects the user's position, posture and motion;

detecting one or more threats to the user including a weapon discharge in the simulation; and determining, by a data analysis component, a reaction of the user in response to the threats and whether the user discharged their weapon simulator.

2. The method of claim 1, wherein determining the initial physiological orientation of the user by the motion tracker component and the one or more wearable sensors comprises determining a position of the one or more limbs of the user.

3. The method of claim 1, wherein determining the initial physiological orientation of the user by the motion tracker component and the one or more wearable sensors comprises determining a facial direction of the user.

4. The method of claim 1, wherein determining the initial physiological orientation of the user comprises determining an eye gaze direction of the user by the user-facing camera included within the goggles.

5. The method of claim 1, further comprising:

comparing, by the data analysis component, a second physiological orientation of the user to an expected physiological orientation of the user; and generating, by the data analysis component, a user score based on the comparison.

6. The method of claim 5, wherein comparing the second physiological orientation of the user to the expected physiological orientation of the user, by the data analysis component, includes comparing a position of the one or more limbs of the user.

7. The method of claim 5, wherein comparing the second physiological orientation of the user to the expected physiological orientation of the user, by the data analysis component, includes comparing a facial direction of the user to an expected facial direction.

8. The method of claim 1, wherein the system is a motion capture virtual reality system comprising the motion tracker component, the weapon simulator, and the data analysis component, and wherein the one or more wearable sensors are active sensors.

9. The method of claim 1, wherein the data analysis component determines under what circumstances, and in what position a user's weapon simulator was discharged.

10. A weapon usage evaluation system, comprising:

a motion tracking system comprising one or more cameras deployed in an area of a firearm usage simulation, configured to track devices associated with each of one or more users including wearable sensors worn by the one or more users and a weapon simulator;

a head mounted display (HMD) assigned to each of the users;

a proximity detection module configured to detect the devices in closest proximity to each HMD and associate those devices with the user corresponding to the HMD;

an avatar generator configured to generate an avatar representing each user in the simulation, wherein the avatar's position, posture and movement in the simulation reflects the user's position, posture, and movement;

a scenario management system, configured to receive motion information of the one or more users from the motion tracking system and threat detection information, including discharge of a weapon; and a weapon simulator configured to provide discharge information associated with discharge of the user's weapon simulator in the simulation and position information of the user's weapon simulator at the time of discharge to the scenario management system including at least reaction time information that includes reaction to the threat.

11. The system of claim 10, further comprising an inertial tracking device affixed to the weapon simulator.

12. The system of claim 11, further comprising a shock mount configured and disposed between the weapon simulator and the inertial tracking device.

13. The system of claim 12, wherein the shock mount comprises:

a top plate;

a bottom plate; and a plurality of resilient members configured and disposed between the top plate and the bottom plate.

14. The system of claim 10, wherein the weapon simulator comprises:

a trigger;

a motor configured and disposed to generate a vibration in response to activation of the trigger; and a communication module configured and disposed to wirelessly transmit a trigger indication to the scenario management system in response to activation of the trigger.

15. The system of claim 10, further comprising an inverse kinematic solver.

16. The system of claim 10, further comprising:

a processor;

a memory coupled to the processor, wherein the memory contains instructions, that when executed by the processor, cause the processor to perform steps of:

determining an initial position of a user;

determining an initial physiological orientation of the user;

detecting a simulated weapon discharge; and determining a reaction of the user in response to the simulated weapon discharge.

17. The system of claim 16, wherein the memory further contains instructions, that when executed by the processor, cause the processor to perform the step of determining a position of one or more limbs of the user.

18. The system of claim 16, wherein the memory further contains instructions, that when executed by the processor, cause the processor to perform the step of determining a facial direction of the user.

19. The system of claim 10, wherein the weapon usage evaluation system is a motion capture virtual reality weapon usage evaluation system, and wherein the one or more wearable sensors are active sensors.

\* \* \* \* \*